Dec. 17, 1968 W. M. CRIMMINS 3,416,443

SELECTIVELY POSITIONABLE PRINT HEADS FOR SCORER PRINTER

Filed July 8, 1966 17 Sheets-Sheet 1

Inventor
William M. Crimmins

By Hofgren, Wegner, Allen, Stellman & McCord Att'ys

Dec. 17, 1968 W. M. CRIMMINS 3,416,443

SELECTIVELY POSITIONABLE PRINT HEADS FOR SCORER PRINTER

Filed July 8, 1966 17 Sheets-Sheet 3

Dec. 17, 1968 W. M. CRIMMINS 3,416,443

SELECTIVELY POSITIONABLE PRINT HEADS FOR SCORER PRINTER

Filed July 8, 1966 17 Sheets-Sheet 8

Dec. 17, 1968 W. M. CRIMMINS 3,416,443

SELECTIVELY POSITIONABLE PRINT HEADS FOR SCORER PRINTER

Filed July 8, 1966 17 Sheets-Sheet 9

SELECTIVELY POSITIONABLE PRINT HEADS FOR SCORER PRINTER

United States Patent Office 3,416,443
Patented Dec. 17, 1968

3,416,443

SELECTIVELY POSITIONABLE PRINT HEADS FOR SCORER PRINTER

William M. Crimmins, Muskegon, Mich., assignor to Brunswick Corporation, a corporation of Delaware Filed July 8, 1966, Ser. No. 563,742
31 Claims. (Cl. 101—93)

ABSTRACT OF THE DISCLOSURE

A device for printing bowling scores on a score sheet from frame and score information and bowler identification information which uses one printer for each score sheet. The printer includes a relatively large carriage with a print head on the carriage and the carriage can be driven across bowler lines to position the print head at the proper bowler line. The print head includes an array of single digit printing members, one for each frame column on the score sheet and each member has a plurality of type character elements indexable to present the correct digit to be printed at a printing station. The print members are interconnected so that they can all be simultaneously shifted along the bowler line to print a plurality of digits of a single score value. A common unidirectional drive can index all of the print members to ready them for printing the same digit but the print members are individually actuable through a latch and bail system so that printing can be effected in one frame column at a time without actuating the other print members. A plurality of such printers can be used to print on a corresponding plurality of score sheets and the plurality printers can be driven from a common motor system.

This invention relates to an apparatus for printing and more particularly to an apparatus for printing on a two-dimensional bowling scoresheet in a plurality of parallel bowler lines, each bowler line includes a plurality of successive frame spaces and each frame including a plurality of different areas for different specific information.

It is a general object of the invention to provide a new and improved printing apparatus of the character mentioned.

A more specific object is to provide a new and improved apparatus of the type described including a printer carriage mounted for movement transverse to the bowling lines, and a plurality of printing means on the carriage including one printing means normally associated respectively with each of the frame spaces.

It is also an object of the invention to provide a new and improved printing apparatus including a platen for supporting a scoresheet adapted to be printed upon, a carriage having means for printing on the scoresheet, and means mounting the carriage for movement between a retracted position exposing the scoresheet to view and an operative position over the scoresheet for printing thereon.

Another object is to provide a new and improved apparatus of the type described wherein each of the plurality of printing means respectively for the separate frames comprises a single printing member, and including means providing for movement of the printing means a limited distance in a direction parallel to the bowler lines for respectively disposing the printing member in alignment with a plurality of columns in each frame space.

A further object is to provide a new and improved apparatus as described wherein each of the printing members comprises an indexable element carrying a plurality of type characters each of which is adapted to be indexed to a position for printing, each of the printing members being carried on a pivotally mounted arm movable through a printing stroke.

It is also an object of the invention to provide an apparatus of the type referred to above including a plurality of bails respectively associated with the printer arms and selectively operable for releasing a selected arm for printing in a selected frame.

An additional object is to provide a new and improved printing apparatus of the type described including a restoring bail common to all of the printer arms and adapted to reset the latter after a printing operation.

A further object is to provide an apparatus of the character mentioned wherein the indexible printing elements comprise rotary wheels, and including character selection means for simultaneously indexing all of the printing wheels.

A still further object is to provide in a printing system as described wherein unidirectional drive means are provided for indexing the printing wheels for character selection.

It is also an object to provide a yieldable drive means for indexing the printer wheels for character selection together with selectively operable stop means corresponding respectively with the characters on the print wheel for controlling character selection.

Another object of the invention is to provide selectively operable means for positioning the printing means longitudinally relative to the bowler lines provided on a scoresheet or on the platen.

An additional object is to provide in a printing apparatus of the character mentioned, an aligning and locking means for holding each printer wheel in properly indexed position during printing.

A further object is to provide, in an apparatus as described, a one-revolution timing shaft for appropriately cycling the moving parts.

Yet another object is to provide a new and useful printing system in which a printer can be run continuously through consecutive uninterrupted cycles for printing the same or different selected characters in any one or all of a plurality of printing columns.

In the printing of bowling scores, after a ball is thrown, the printed must frequently print in more than one frame. This requirement detracts significantly from the speed of printing with conventional printers. Thus, it is still another object to provide a new and useful high speed printing system for printing bowling scores, which system eliminates the need for stopping to index the printing mechanism from frame to frame.

Other objects will be apparent from the frollowing description and the drawings in which.

Figure 1:
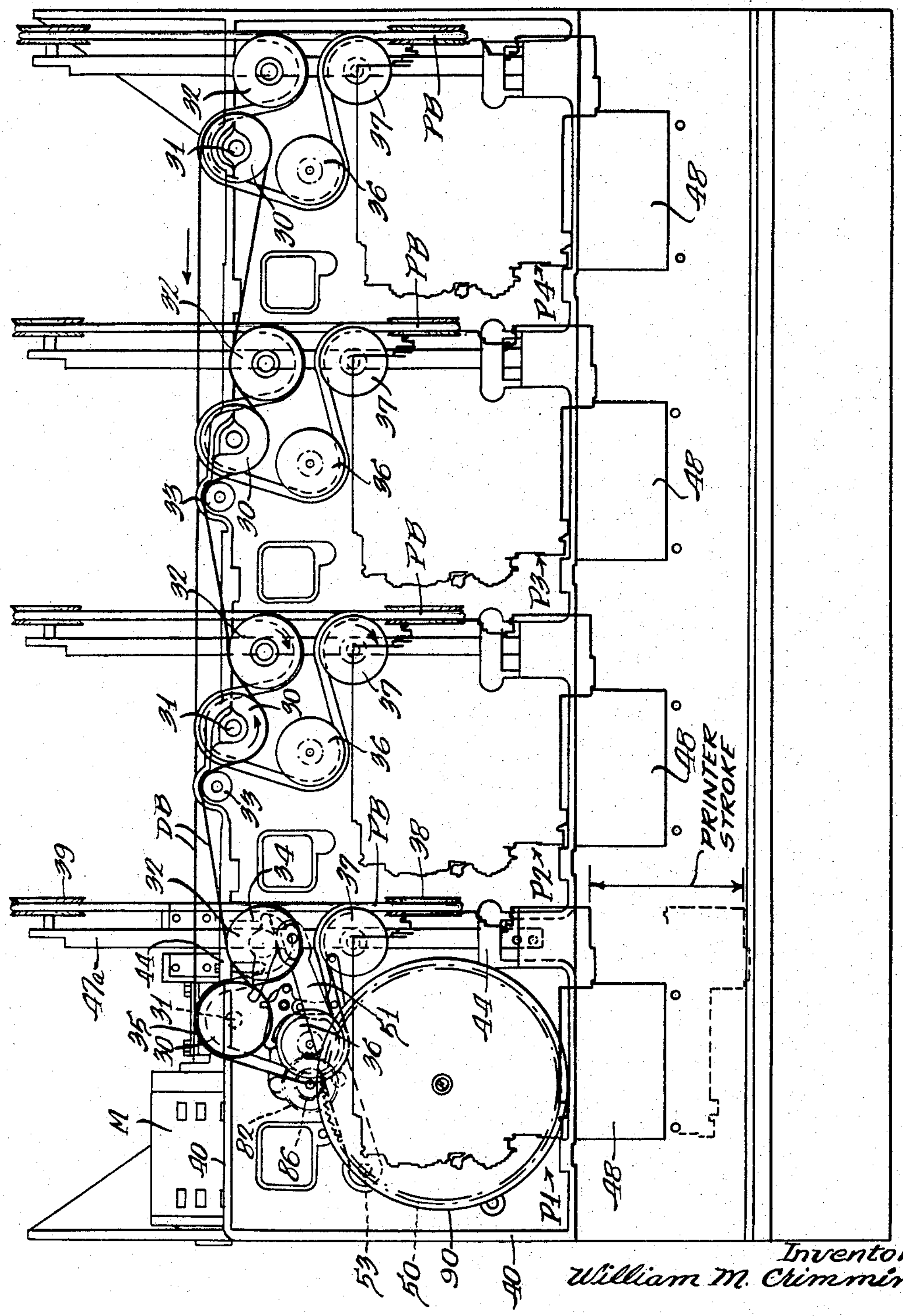
FIG. 1 is a plan view of a plurality of bowling score printers illustrating a common drive and the location of four platens for supporting scoresheets, as well as the four print heads associated respectively with the platens, the print heads being illustrated in retracted positions.

While this invention is susceptible of embodiment in many different forms, there is shown in the drawings and will herein be described in detail embodiments of the invention with the understanding that the present disclosure is to be considered as an exemplification of the principles of the invention and is not intended to limit the invention to the embodiments specifically illustrated or disclosed.

An illustrative embodiment of the invention will now be described. The embodiment utilizes a plurality of printers, all driven from a common source. Each printer is capable of orientation relative to a scoresheet, supported in a projection system, for printing any bowler or team score on the scoresheet in any frame for any of a plurality of bowlers or teams.

Accordingly, in the embodiment illustrated, each printer includes a print head, a system for positioning the print head from one bowler's score line to any other bowler's score line on a scoresheet, a system for enabling the printer to orient for printing various score values in various columns in each frame, a system for assuring printing score values in the proper frame, a system for setting the type in the print head and a timed control system for controlling overall operation of the printer throughout each required or desired print cycle.

*Drive system for plurality of printers*

Referring first to FIGURE 1, the illustrated system includes a plurality of four printers $P_1$ through $P_4$, all supplied with a drive from a common motive source. Each printer has a drive pulley 30 mounted on a pivot stud 31. A flat endless drive belt DB extends around the four drive pulleys 30 and suitable idler pulleys 32 and 33. A motor M is provided to continuously drive pulley 30 on stud 31 of printer $P_1$ so that all pulleys 30 are continuously driven counterclockwise as viewed in FIGURE 1.

In each printer, a pulley 35 is secured to pulley 30 for rotation therewith on shaft 31 and a pulley 34 is secured to pulley 32 for rotation therewith on a common pivot stud. The studs of pulleys 30, 34 and 32, 35 are mounted on a stationary frame 40, on which pulleys 36 and 37 are also mounted for rotation. An additional two pulleys 38 and 39 are mounted on a carriage frame 41 which is supported by and movable relative to frame 40 through a stroke identified as "printer stroke" in FIGURE 1.

An endless belt PB is provided for each printer $P_1$–$P_4$ around pulleys 34 through 39 seriatim and returning from pulley 39 directly to pulley 34. All belts PB are continuously driven with drive belt DB through the interconnected pulley pairs 30, 35 on pivot studs 31. It will be noted that the disposition of pulleys 34–37 on frame 40 and the direction in which belt PB engages these pulleys will permit sliding of frame 41, carrying pulleys 38 and 39 through the printer stroke without creating slack in or binding the belt PB.

*Print head carriage drive*

Figure 5:
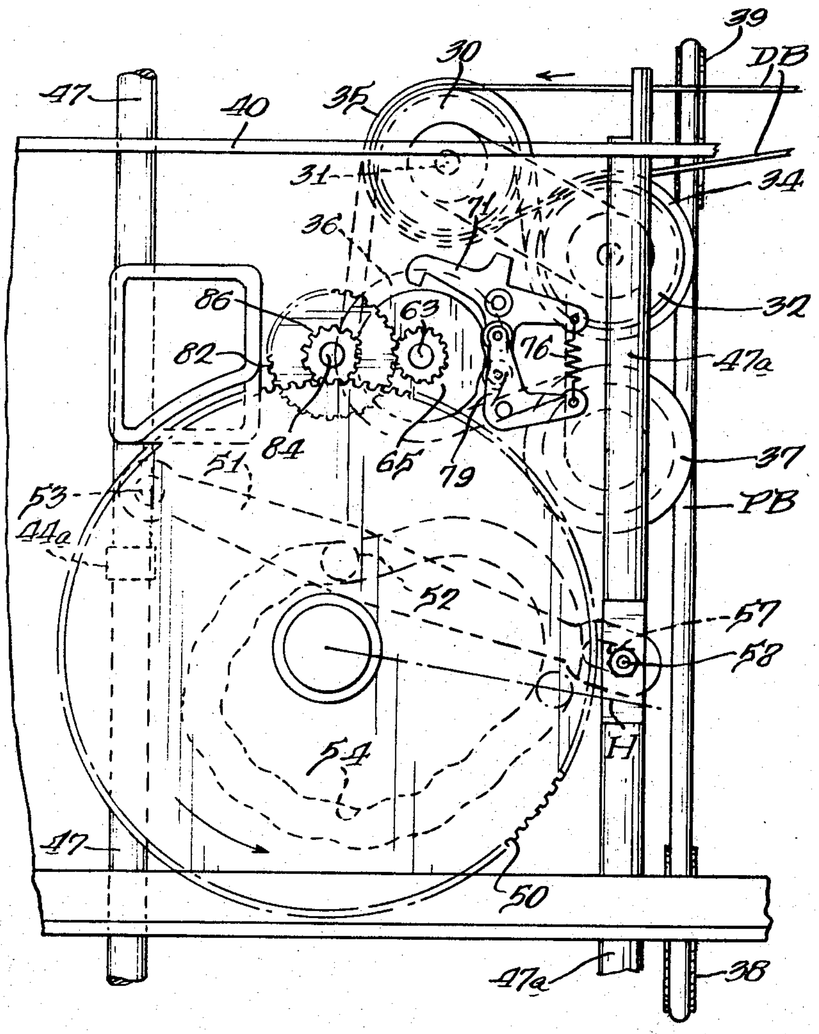
FIG. 5 is a plan view of the actuating mechanism for moving the print head in a Y direction relative to the platen and scoresheet; illustrated with the print head in extended or printing position and including a sketched indication of a groove in a Y-drive cam.

Turning now to FIGURES 3–6, each printer of the embodiment illustrated includes the stationary frame 40 which is secured to suitable supports and the carriage frame 41 which can be driven relative to the frame 40 in a Y direction. Mounted in front of the frame 40 and secured thereto by suitable supports 43 is a prism 42 which forms the prism of a prism projection system such as that described by J. A. Russell et al. in application Ser. No. 365,960, filed May 8, 1964, entitled "Projection Apparatus" and assigned to the common assignee of this application. Referring especially to FIGS. 1 and 5, the stationary frame 40 has a pair of sleeve bearings 44 and an elongate rod 47 secured thereto and the driven frame 41 has a sleeve bearing **44*a* and an elongate rod 47*a* secured thereto. Sleeve bearings 44 receive rod 47*a* and sleeve bearing 44*a* rests on rod 47 so that the driven frame 41 can be driven relative to frame 40 away from its retracted position shown in FIG. 1 in a forward direction to an extended or printing position overlying the prism 42. The driven frame 41 has a print head 45 mounted thereon so that the print head can be carried to various positions about prism 42**. Such movement of the print head permits printing on a scoresheet disposed upon the prism in a manner similar to that described by J. A. Russell in the above identified application Ser. No. 365,960.

Figure 2:
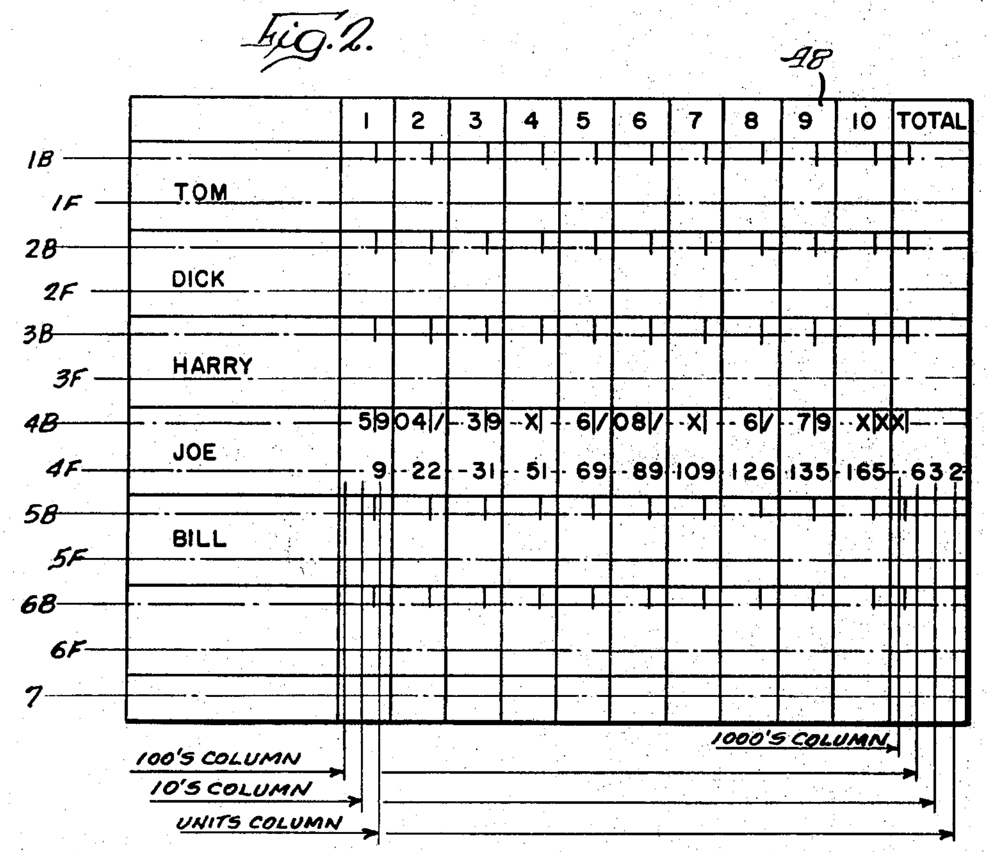
FIG. 2 is a plan view of a scoresheet to be supported on each platen.
Figure 4:
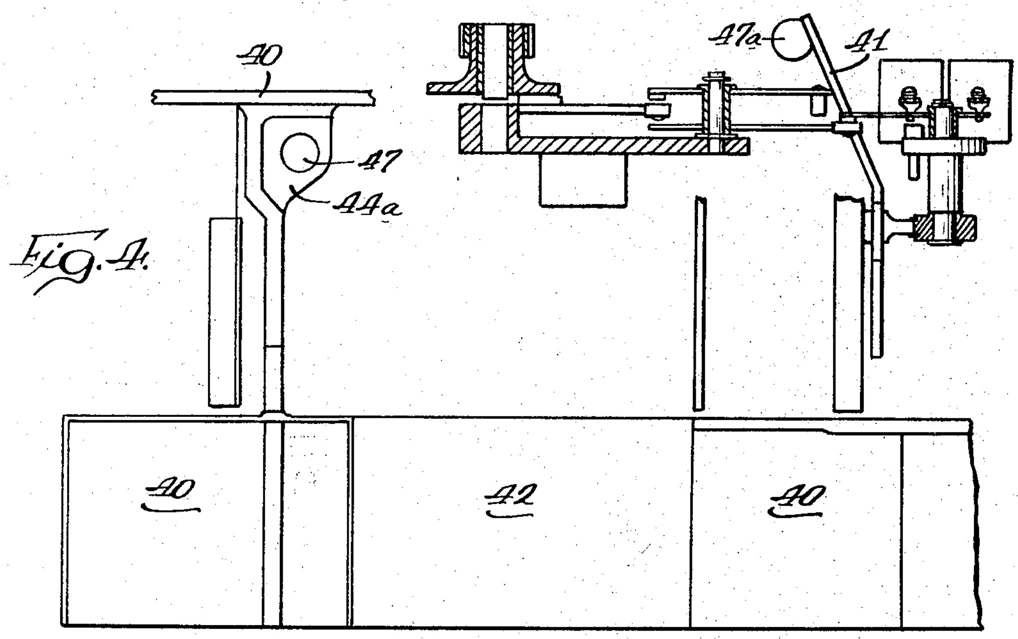
FIG. 4 is a fragmentary front elevational view of mechanism illustrated in FIG. 3.
Figure 3:
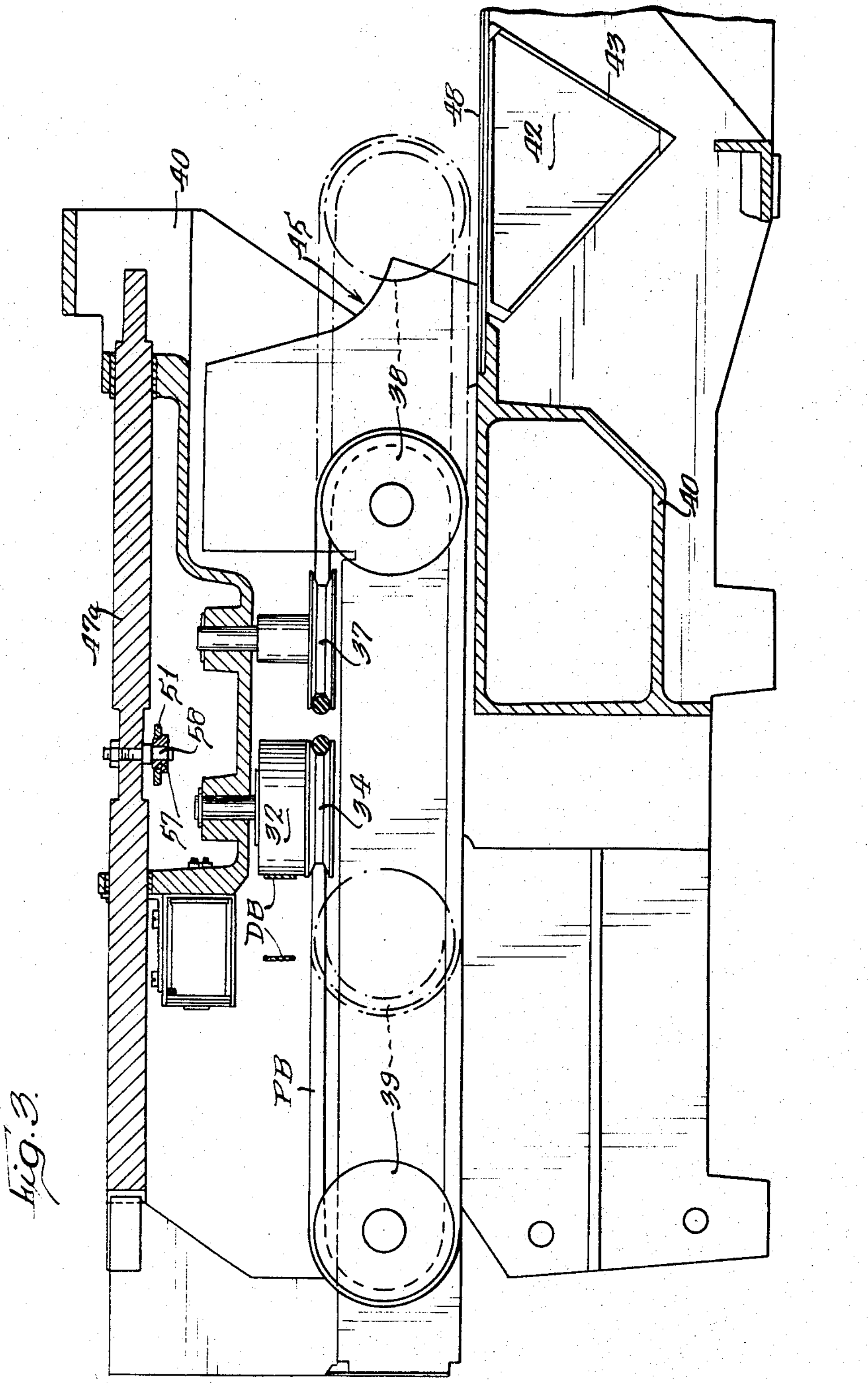
FIG. 3 is a side elevational view of one printer shown in FIG. 1, illustrating the support of one of the print heads for movement in a Y direction relative to one of the platens and scoresheets.

Referring now to FIGURE 2, there is illustrated a scoresheet 48 intended to be disposed upon the prism. For orientation of the scoresheet 48, reference is made to FIGURE 3, wherein the top of the scoresheet 48 is disposed to the left on the surface of prism 42. Thus, it will be seen that different increments of movement of the print head over the prism will align the print head with the various score lines of the various players indicated on the scoresheet.

For the purpose of driving the driven frame 41 relative to the stationary frame 40, a printer drive cam 50 is mounted on the stationary frame 40. A drive arm 51 (FIG. 5) having a follower roller 52 is pivotally fixed to stationary frame 40 at one end at 53. The roller 52 is disposed in groove 54 for following the groove when cam 50 is rotated. The other end of drive arm 51 is slotted at 57 to receive a pin 58 which is secured to rod **47*a* and the driven frame 41. Driven frame 41 is in home position when cam 50 is in position with pin 52 in groove 54 and on the centerline H in FIG. 5, i.e. with cam 50 indexed about 90° counterclockwise from its position shown in FIG. 5. It will be seen that each complete revolution of cam 50 in a counterclockwise direction will pivot drive arm 51 away from home position clockwise to the position shown in FIG. 5 and will return the arm counterclockwise about pivot pin 53 to home position. The cam 50 thereby drives frame 41 relative to frame 40** first forwardly away from its home position to its extended position and then rearwardly back to home position.

Referring more particularly now to the printer drive cam 50, the cam is configurated so as to drive frame 41 away from home position one increment of distance, proceed in a short dwell, drive another increment of distance, proceed in another short dwell, etc., until the frame 41 has been driven thirteen equal increments of distance. The dwells, thirteen in total, are spaced approximately 18 degrees from each other with respect to rotation of cam 50. The first dwell aligns the printer for printing box score in the first bowler's line, the second dwell for frame score in the first bowler's line, the third dwell for box score in the second bowler's line, and so on down the scoresheet of FIGURE 2 until the 13th dwell disposes the print head for printing total score in line 7 of the scoresheet.

Figure 6:
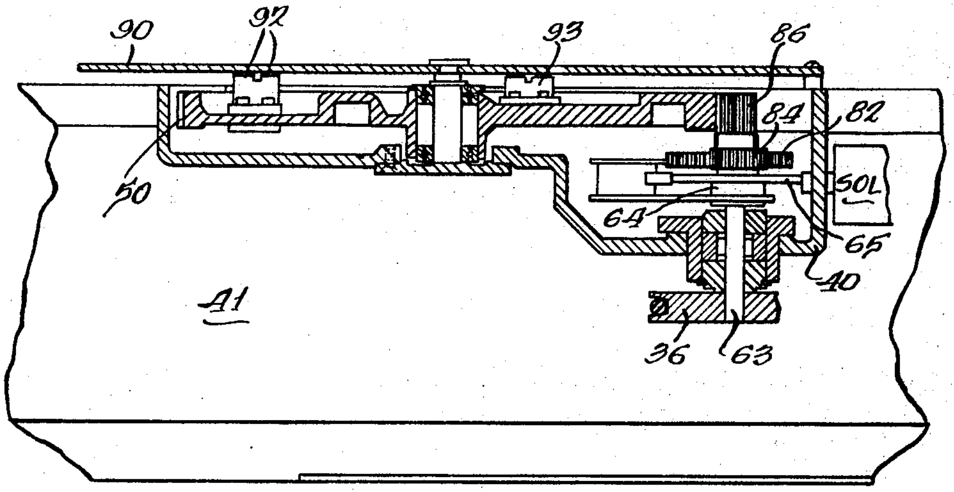
FIG. 6 is an opposite side elevational view of the printer head drive mechanism.
Figure 8:
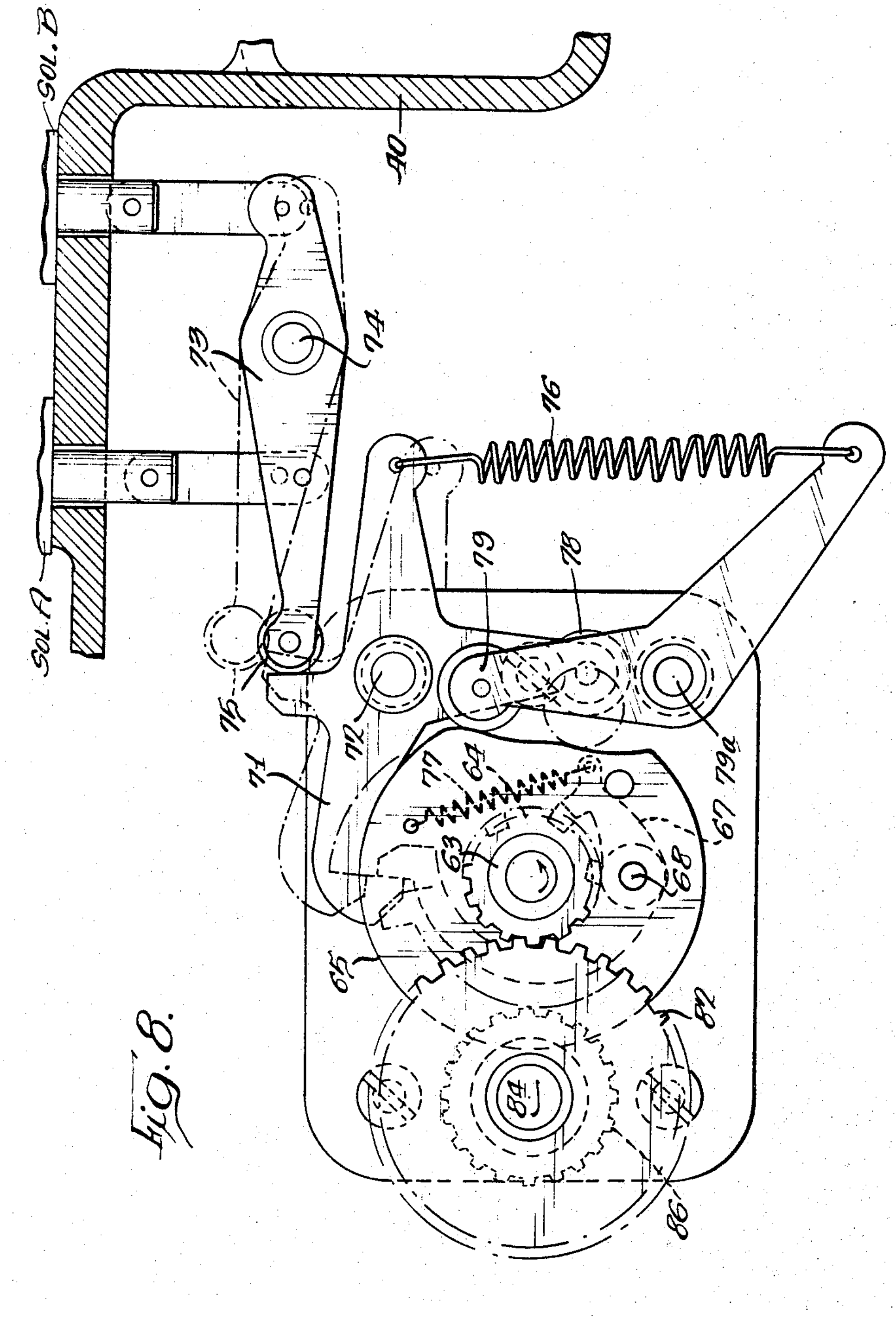
FIG. 8 is an enlarged fragmentary plan view of a portion of the mechanism shown in FIG. 5.

For the purpose of driving cam 50, a one-revolution clutch is provided. The clutch will drive cam 50 through 18 degrees of rotation for each revolution of clutch 60. Referring especially to FIGURES 6 and 8, this result is provided by the continuously driven pulley 36, which is secured to a shaft 63, suitably supported by bearings from frame 40. A ratchet wheel 64 is secured to shaft 63 for rotation therewith. Above ratchet wheel 64, a cam and gear assembly 65 is mounted for rotation on the extension of shaft 63. A pawl 67 (FIG. 8) is pivotally mounted at 68 on the side of cam 65 and faces ratchet wheel 64. Pawl 67 is engaged by a latch member 71 which is pivotally mounted by pin 72, holding pawl 67 out of engagement with ratchet wheel 64. A lever 73 pivotally mounted at 74 has a roller 75 engaging latch member 71 and retaining latch member 71 in engagement with pawl 76. Solenoids A and B are mounted on frame 40 for pivoting lever 73 on pin 74 clockwise and counterclockwise, respectively. Solenoid B is deenergized whenever solenoid A is energized and is energized whenever solenoid A is deenergized. Energizing solenoid A pivots lever 73 clockwise to unblock latch member 71 and permit a spring 76 to urge latch 71 clockwise about pin 72 and away from latching engagement with pawl 67. A spring 77, biasing between the tooth end of pawl 67 and cam 65, urges pawl 67 into engagement with ratchet wheel 64, thereby rotating cam and gear assembly 65 on and with shaft 63.

Latch member 71 has an arm carrying a roller 78 which rides on the outer edge of cam 65. Cam 65 is so configurated to permit roller 78 to ride a low for a sufficient time for latch member 71 to clear pawl 67 upon its release by energizing solenoid A. Thereafter, roller 78 returns to the high of cam 65. If solenoid A is maintained energized for a plurality of rotations of cam and gear assembly 65, spring 76 will urge roller 78 into the low of cam 65 each time latch member 71 is about to engage the pawl so that latch member 71 is pivoted over pawl 67 and does not engage until solenoid A is deenergized and solenoid B is energized. Solenoid B, on energization, pivots lever 73 to block latch member 71 from moving clockwise to clear pawl 67 the next time the low on cam 65 is presented to roller 78. Latch 71 then engages pawl 67, causing pawl 67 to pivot and disengage from wheel 64 to stop rotation of cam and gear assembly 65.

The downward slope at the beginning of the low on cam 65 is presented to the roller of a follower 79, which is pivotably mounted on pin 79*a* to follow cam 65, whenever latch 71 is disengaged from pawl 67. Tension spring 76, urging the follower 79 against this downward slope, provides a starting torque applied to cam and gear assembly 65 each time latch 71 disengages pawl 67. Thus, each time soenoid A is energized and solenoid B is deenergized to engage the clutch for rotating cam and gear assembly 65, the starting torque initiates rotation of cam and gear assembly 65 to lessen the impact of engagement of pawl 67 in the rotating ratchet 64 on shaft 63. Also, this torque is applied at the end of each revolution as follower 79 enters the low so that, when solenoid B is energized and solenoid A is deenergized to reengage latch 71 with pawl 67 and pawl 67 disengages ratchet 64, the torque applied by spring 76 through follower 79 on the downward slope of the low on cam 65 will cause cam and gear assembly 65 to complete the full rotation and will hold cam and gear assembly 65 against reversal.

The gear of cam and gear assembly 65 is in mesh with another gear 82 rotatable on a suitable stud 84. Facially secured to gear 82 is still another gear 86 which is in mesh with gear teeth around the periphery of cam 50. The gear train provided by gears 65, 22, and 86 is such as to drive cam 50 through 18 degrees of rotation for each revolution of cam and gear assembly 65.

Referring again to the cam as shown in FIGURE 5, it will be noted that the first dwell is approximately 36 degrees from the home position of the cam indicated H. Each of the remaining dwells follow seriatim at 18 degree intervals and are attained by one additional revolution of cam and gear assembly 65. Six revolutions of shaft 66 then return the cam to its home position, thereby withdrawing the driven frame 41 from above prism 42.

Figure 7:
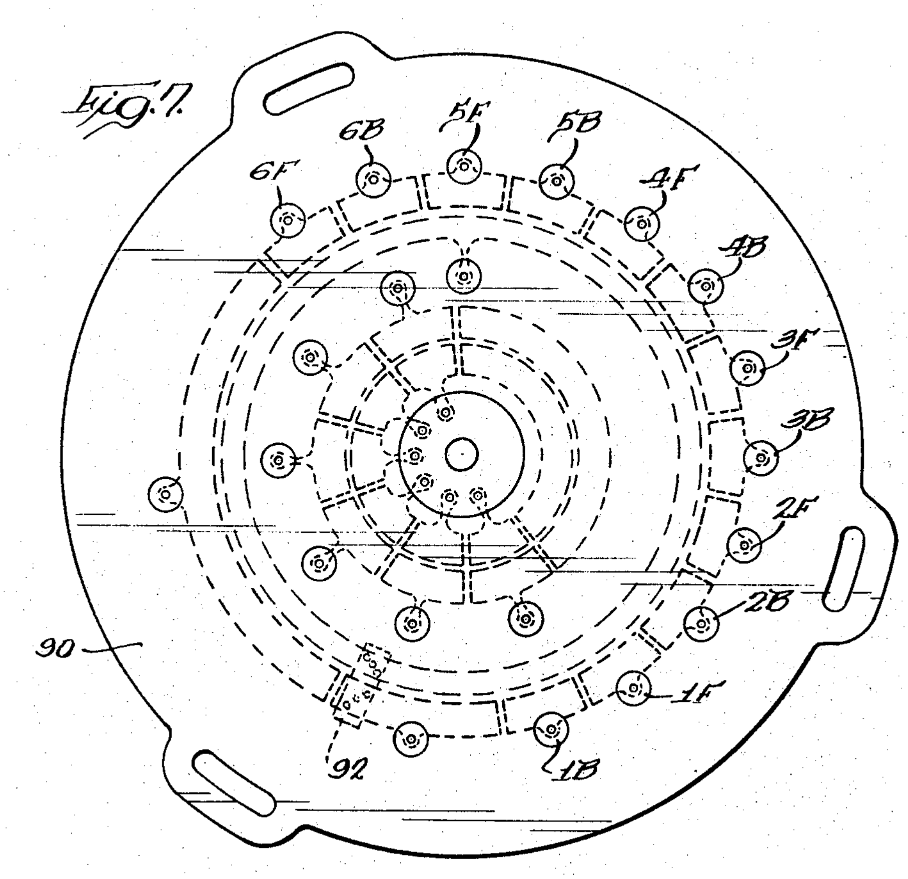
FIG. 7 is a plan view of a commutator disc used in controlling the movement of the print head in the Y direction.

For controlling the movement of frame 41 relative to frame 40, a commutator system is provided. The commutator includes a commutator board 90 (FIGS. 6 and 7) mounted above the coaxial with the cam 50. Commutator board 90 is secured against rotation and is traced by contacts 92 and 93 mounted on cam 50. The starting position of contact 92 is shown in phantom on the plan of the commutatior board in FIGURE 7. Assuming that solenoid A is maintained energized, cam 50 will continue to rotate and contact 92 will trace the printed circuitry on the commutator board 90. Each of the 1–B through 6–B contacts of the outer ring circuit on the commutator board is electrically connected for energization through the bowler identification switch at the bowler's end of the bowling lane. The 1–B contact is connected with the first bowler's switch, the 2–B contact with the second bowler's switch, etc., such that the contact is deenergized each time a bowler operates a switch preparatory to bowling. Each of the 1–F through 6–F contacts of the outer ring is connected to electrical circuitry in an appropriate computer for bowling scores, for deenergization of the contacts by a signal from the computer that it is desired to print cumulative frame score. The RTT contact is connected to the computer for deenergization when it is desired to print running team totals, and the C contact is electrically connected to complete a circuit to solenoid A and break a circuit to solenoid B whenever the contact 92 bridges and electrically connects the C commutator strip with an energized one of the 1–F, 2–B, etc., segments. Thus, as contact 92 rides on and bridges the C contact and the next outer row of segments, as long as a circuit is completed, the cam 50 will continue to rotate. As soon as the contact 92 passes on to a deenergized segment, the circuit to solenoid A is broken and solenoid B is energized, resulting in stopping cam 50 and stopping the outward travel of frame 41. It will be seen from FIGURE 7 that the outer row of segments are properly angularly disposed to stop cam 50 on the dwell corresponding to the printing line on scoresheet 48 which has been called for by deenergization of any specific one of the segments. The inner ring of contacts can be used for other purposes, e.g. as bowler identity contacts for a parity check.

Figure 10:
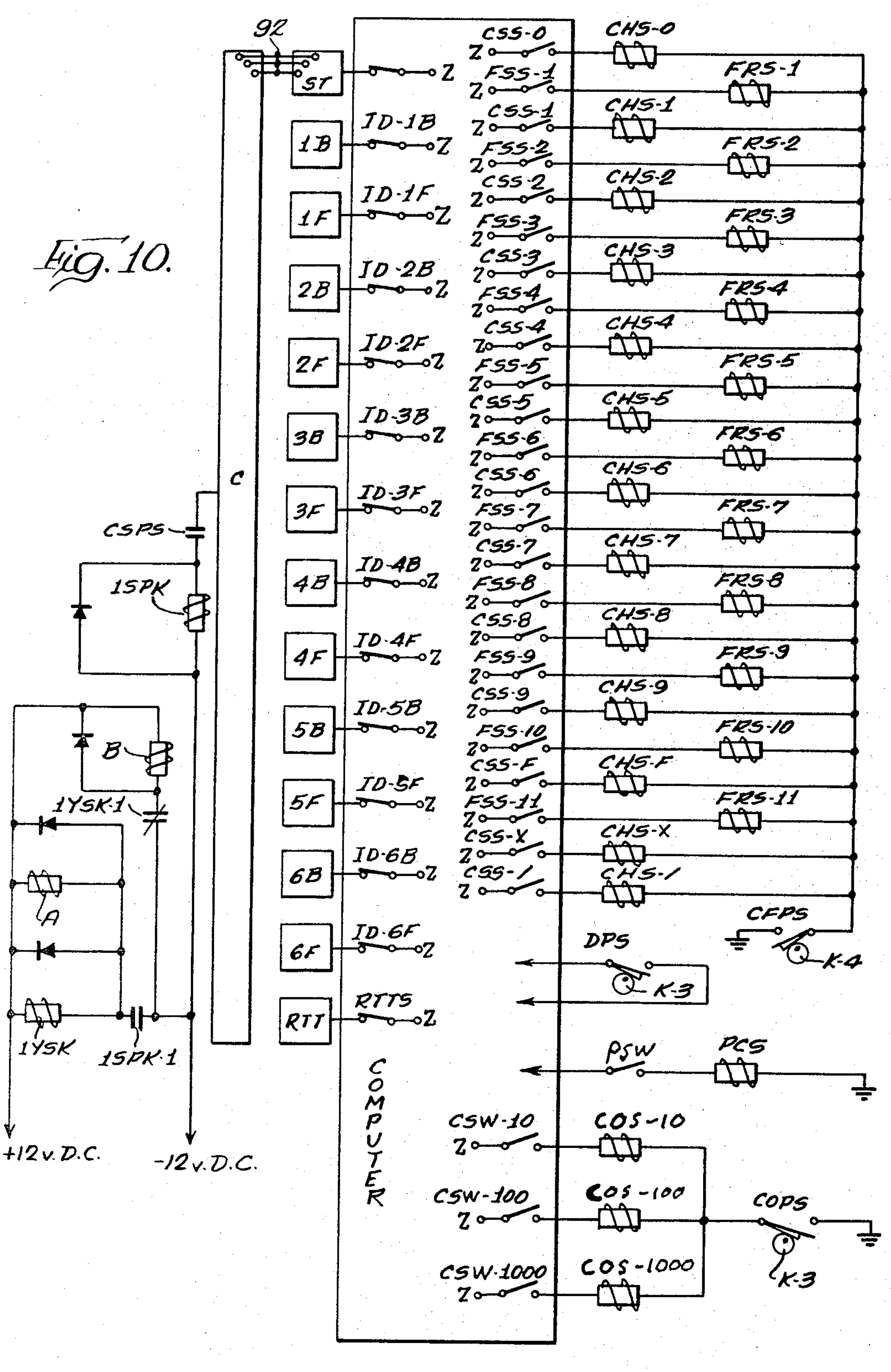
FIG. 10 is a wiring diagram of the printer control.

As a more specific illustration of useful circuitry for controlling energization and deenergization of solenoids A and B, reference is made to the wiring diagram of FIGURE 10. So long as contact 92 bridges contact C and an energized one of the other contacts shown in alignment next to contact C, relay ISPK remains energized, contact ISPK–1 of relay ISPK is closed to keep relay IYSK energized, thereby keeping its contact IYSK–1 open to keep solenoid B deenergized. When contact 92 finds a dead commutator board contact, relay ISPK is deenergized and ISPK–1 breaks to deenergize solenoid A and relay IYSK; relay contact IYSK–1 closes and solenoid B is thereby energized to stop movement of frame 41.

*The print head*

Figure 21:
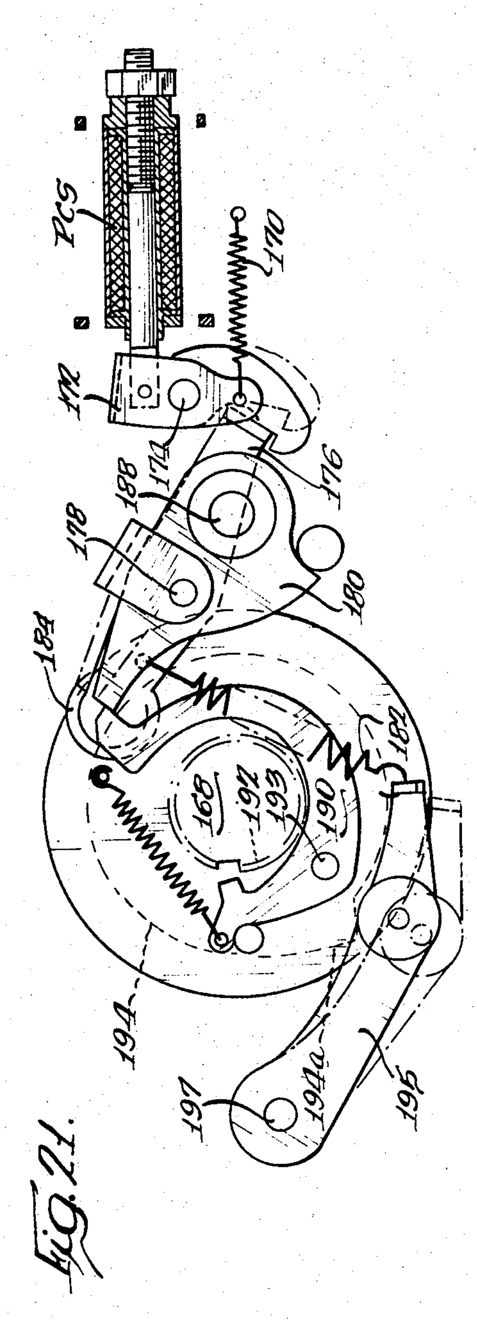
FIG. 21 is an elevational view of a one-revolution clutch mechanism for controlling drive of the cam shaft.
Figure 22:
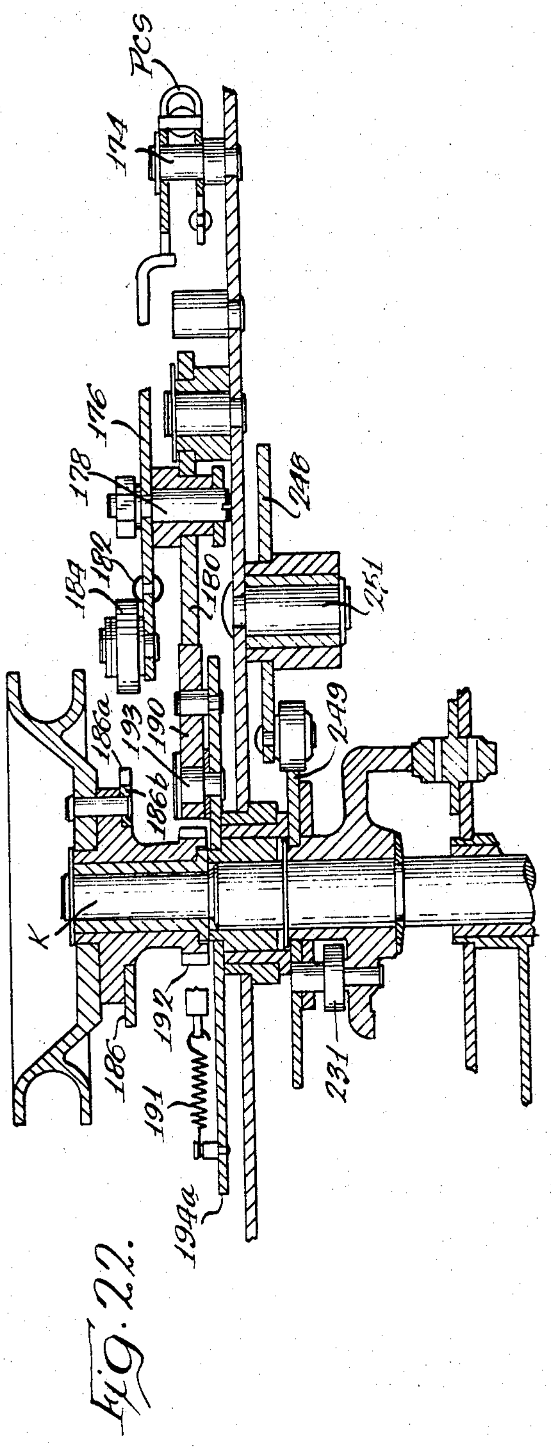
FIG. 22 is a generally horizontal sectional view of the mechanism shown in FIG. 21.

Referring to FIGURES 11, 12, 14–16 and 19–22, the print head includes a power shaft K which is actuated by one-revolution clutch once for each printing operation to be conducted. The one-revolution clutch is in turn actuated by the above-described belt system which continuously turns pulley 38 on the print head. Referring especially to FIGURES 21 and 22, pulley 38 is secured to a cam 186 which is continuously rotated with pulley 38. Cam 186 is part of the input system to the one-revolution clutch which supplies the rotational power, through the clutch, to shaft K. This input to the clutch as best seen in FIGURE 22, includes the cam 186 and a ratchet 192.

Referring especially to FIGURES 21 and 22, in the system for actuating the one-revolution shaft, a spring 170 normally holds a latch 172 pivoted to a counterclockwise position, shown in phantom in FIGURE 21, on pin 172. In this counterclockwise position, latch 172 is disengaged from an arm 176 which is pivotally mounted by pin 178 on another latch 180. A roller 184 is mounted on the end of arm 176 and a spring 182 biases arm 176 counterclockwise on pin 178 to hold roller 184 against the cam 186 which is continuously rotating on shaft K. Cam 186 has a plurality of alternate highs **186*a* and lows 186*b***.

As cam 186 rotates on shaft K, a high **186*a* on cam 186 is presented to roller 184, and roller 184 pivots clockwise on pin 178 to ride over the high each revolution. Latch 180 is engaged with a pawl 190** and remains so engaged.

When it is desired to effect a print operation by rotating shaft K one revolution, solenoid PCS is pulled in. During the period when roller 184 is on the low of cam 186, latch 172 is pivoted into holding engagement with the end of arm 176, preventing arm 176 from pivoting in its normal manner on pin 178. The next time that roller 184 rides up the high **186*a*, the arm 176 functions as a lever grounding against latch 172 and swinging pin 178 and latch 180 clockwise about pin 188 while extending spring 182. The end of latch 180 releases pawl 190 which is in turn pulled by spring 191 into engagement with ratchet 192. Pawl 190 is pivotally mounted by pin 193 to a cam disc 194 which is in turn secured to shaft K. Thus, as ratchet 192 rotates it carries pawl 190, cam disc 194** and shaft K with it.

Energization of solenoid PCS is only momentary, sufficient to permit proper engagement of the clutch as described above. As roller 184 travels on the low of cam 186 with the pawl 190 engaged, the solenoid PCS is released so that latch 176 is disengaged, again permitting roller 184 to roll over the high **186*a* without carrying latch 180 out of blocking engagement with pawl 190. During the last portion of the rotation of shaft K, cam disc 194 presents the downward slope of a high 194*a* to a follower 195 which pivots on pin 197. The other end of tension spring 182, one end of which is attached to arm 176, is attached to follower 195 and urges follower 195 hard against the downward slope of high 194*a*, thereby creating a clockwise torque on shaft K as viewed in FIGURE 21. This torque is sufficient to bring the clutch to its home or starting position after pawl 190 has been cammed out of spline drive or ratchet 192. As pawl 190 returns to its position at the start of the one revolution, it reengages latch 180, and is held out of ratchet 192 until solenoid PCS is again energized. The downward slope of high 194*a* extends into the beginning of the one revolution of shaft K so that each time solenoid PCS is energized to initiate the revolution, a starting or accelerating torque exists on cam 194 and shaft K to start rotation of cam 194 and shaft K when clutch pawl 190 is released by latch 180. Thus, when pawl 190 is released, the starting torque will have started the cam 194 in rotation before pawl 190 engages ratchet 192, resulting in reducing the impact load of pawl 190 engaging ratchet 192**.

As has been seen, the print head can be properly disposed for printing in the proper bowler's line for printing either box or cumulative frame scores. The printer is equipped with a series of 11 print arms 201 through 211 (FIGURES 11 and 14–16), one print arm provided for each frame shown on the scoresheet 48 in FIGURE 2. The first ten frames are the normal frames of a bowling game and the eleventh frame is provided for the purpose of printing total bowler scores or team subtotals and totals. Each of arms 201–211 is mounted on a pivot pin 212 to a support plate 214. The support plates 214 are in turn secured to sleeves 216 and 218 on shafts A and K, respectively. Sleeves 216 and 218 are secured at their ends to and from a part of a laterally shiftable frame 219, the function of which will be described below. Shaft K rotates relative to and within sleeve 218.

A print wheel 220 is mounted by a pivot pin 222 near the end of each print arm; and a print arm drive spring, in the form of a tension spring 224, biases between the other end of each print arm and its support plate 214.

Each print wheel 220 has a series of thirteen printing type for printing the series of characters 0, 1–9, F, X and /. The print wheel can be pivoted on its pin to present any selected one of the thirteen type in a printing position for printing one of the characters as desired. The printing is effected, in general, by pivoting the print arm clockwise as viewed in FIGURE 15 on its pin 212 so that the properly set type on the print wheel 220 prints the desired character on the paper therebelow. It is not necessary to ink the print wheels since the paper used can be of the type described by Cornell et al. in application Ser. No. 243,634, filed Dec. 10, 1962, entitled "Pressure Responsive Material," and assigned to the common assignee of this application. Other paper for transferring an image to a prism with or without providing a permanent printed record can also be used.

Each print wheel has a gear portion 226 having thirteen equally spaced teeth, one on the centerline of each type. Gear portion 226 is in constant mesh with an idler gear 228, mounted by a pivot pin 230 to the print arm, and each idler gear 228 is in constant mesh with a drive gear 232. All drive gears 232 are mounted on a common shaft S for rotation therewith. Shaft S is supported for rotation by suitable bearings mounted on frame 219.

While the print arm is pivoted on its pin 212 clockwise for printing, shaft S holds gears 232 stationary and against rotation; idler gear 228 rolls about pivot center 212 while receiving a tooth of drive gear 232 between two teeth of idler gear 228 and rolls over the received tooth.

Figure 16:
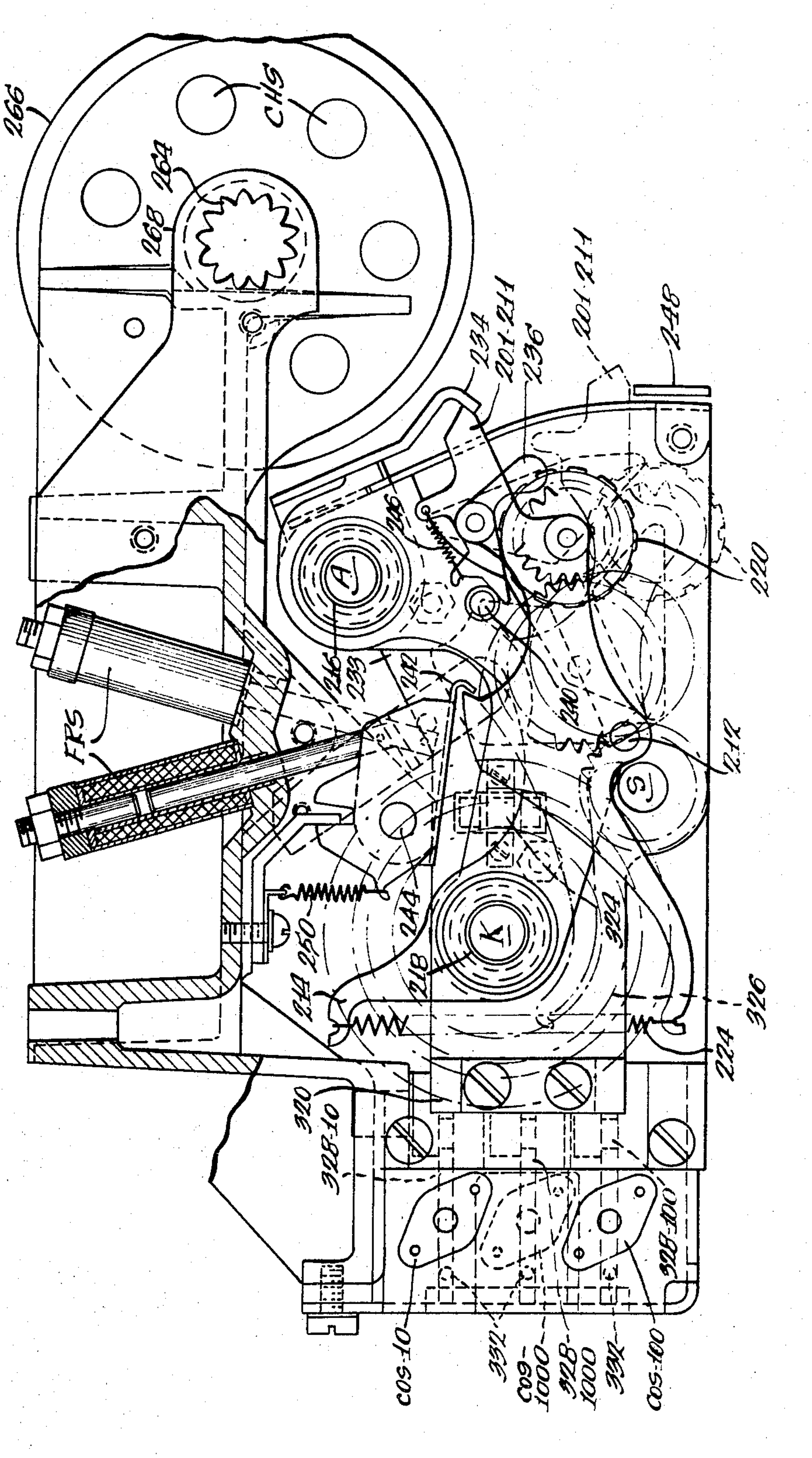
FIG. 16 is a similar view, illustrating the printer arm in a retracted position and showing additional associated mechanism.

The print arms are normally held in restored or nonprinting position, as shown in full lines in FIGURE 16, by latching bail 234, pivoted on sleeve 216, which engages and latches the forward end of the print arm against downward movement. A bail release lever 233 (FIGURES 14 and 16) pivots on shaft A to move bail 234 counterclockwise in FIGURE 16 to release the print arm each time cam roller 231 (FIGURE 22), mounted on and driven by shaft K, engages the bail release lever 233, once during each rotation of shaft K. A print wheel detent 236 is pivotally pinned by a stud 238 to each print arm adjacent its print wheel 220 by a stud 240 on the support plate 14.

Figure 15:
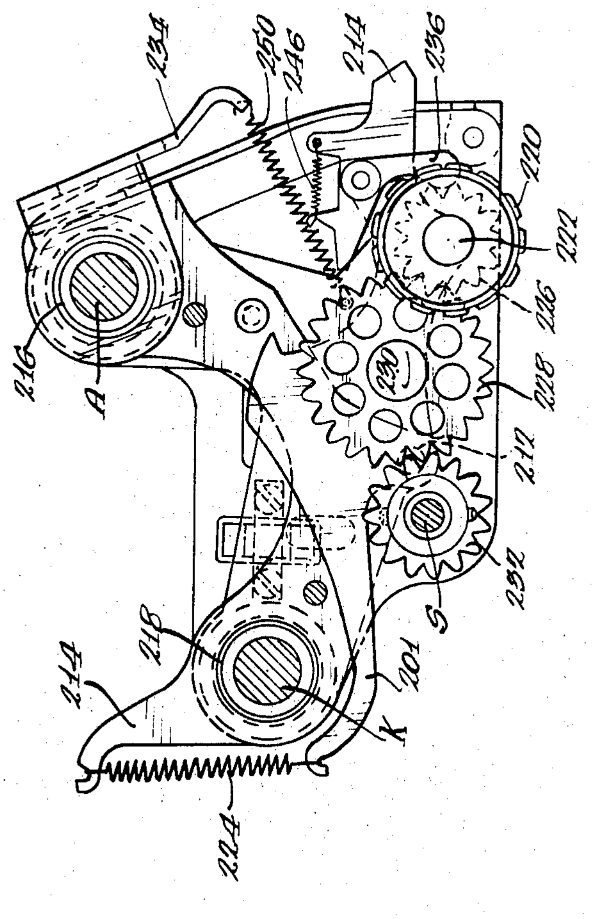
FIG. 15 is a sectional view through the print head illustrating a printer arm and associated mechanism, with the arm released and a print wheel carried by the arm striking the scoresheet.
Figure 20:
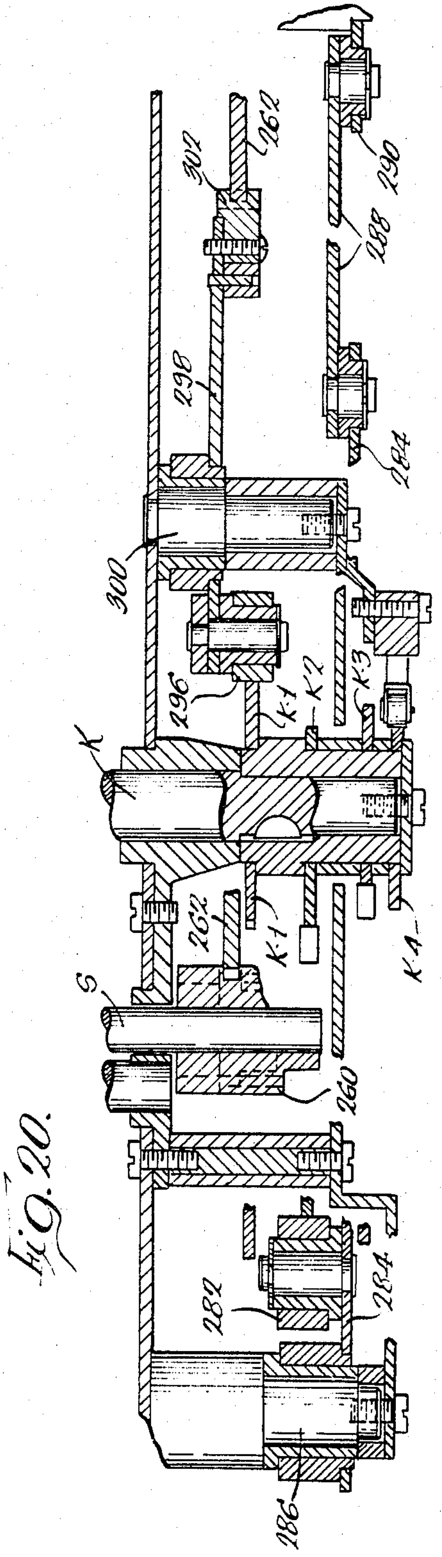
FIG. 20 is a horizontal fragmentary sectional view illustrating a portion of a control cam shaft and control cams thereon.

During a printing operation, drive gears 232 are driven by shaft S to move the selected character of all eleven print wheels into the active print position. Gears 232 are then stopped. A frame selection latch 242, for the proper frame in which printing of the character is to be effected, is pulled by its solenoid FRS counterclockwise about pin 244 and held in open or unlatched position. Roller 231 strikes lever 233 and bail 234 is moved counterclockwise by lever 233 and releases all eleven print arms. The print arm which has its respective frame selection latch 242 held open is driven clockwise in FIGURE 16 by its drive spring 224 to print on the scoresheet as seen in FIGURE 15. The remainder of the print arms are arrested by their latches 242. As the print wheel is thereby driven downward, detent 236 is released from stud 240 and is driven clockwise on pin 238 by its spring 246 to engage gear 226 and detent print wheel 220 before wheel 220 strikes the scoresheet.

The print head then resets. During reset, a print arm restore bail 248, pivotally mounted by pins 251 (FIGURES 14 and 22), is driven by a cam 249 (FIGURE 22) on shaft K in a counterclockwise direction as viewed in FIGURE 16. Bail 248 engages the released print arm and returns it upward, engages the remainder of the print arms and carries all print arms upward to reengage bail 234. Bail 234 is spring urged clockwise on sleeve 216 against a limiting stop by a spring 250 so that the raised print arms snap into engagement with bail 234. As the disengaged print arm is raised, it also snaps through its latch 242 which has been returned downward by spring 252 on deenergization of solenoid FRS. Bail 248 then returns downward.

*Typesetting system*

As has been seen, rotation of shaft S sets the type in the print head to one of thirteen characters. Accordingly, the shaft S is rotated one increment to change the type character to the next adjacent character on the print wheels 220.

For the purpose of putting a proper amount of rotation into shaft S for setting a selected type character, a gear 260 is secured to shaft S and engages and is driven by a large gear 262 (FIGURE 19) secured to shaft A which in turn engages and is driven by gear 264 having thirteen equally spaced teeth and splined to shaft D. The teeth of gear 264 remain in contact synchronization with the print wheel characters. Since the characters on the pivot wheels are seriatim 0 through 9, F, X and /, and the home position of gear 264 corresponds to printing of the character "0" by the print wheel, rotation of the shaft one unit presents the character "1," two units presents the character "2," etc., through nine units of rotation. Ten, eleven and twelve units present F, X and /, respectively, while the thirteenth unit would represent a return to zero and present "0."

Figure 18:
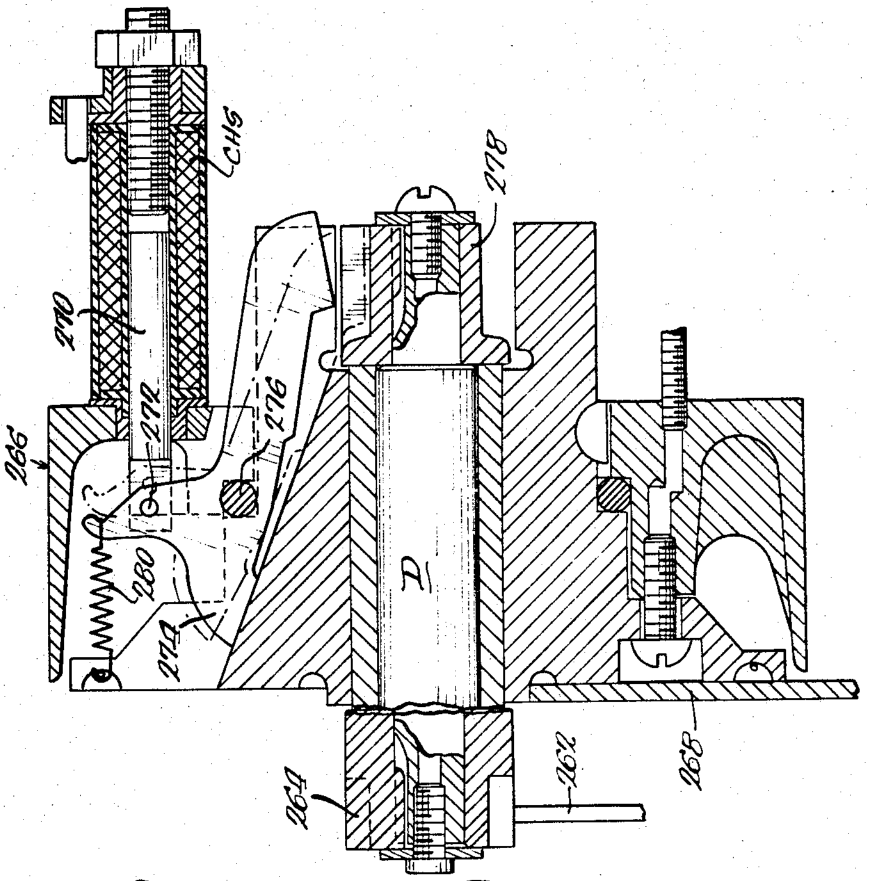
FIG. 18 is a sectional view of the mechanism shown in FIG. 17, taken at about the line 18—18.
Figure 17:
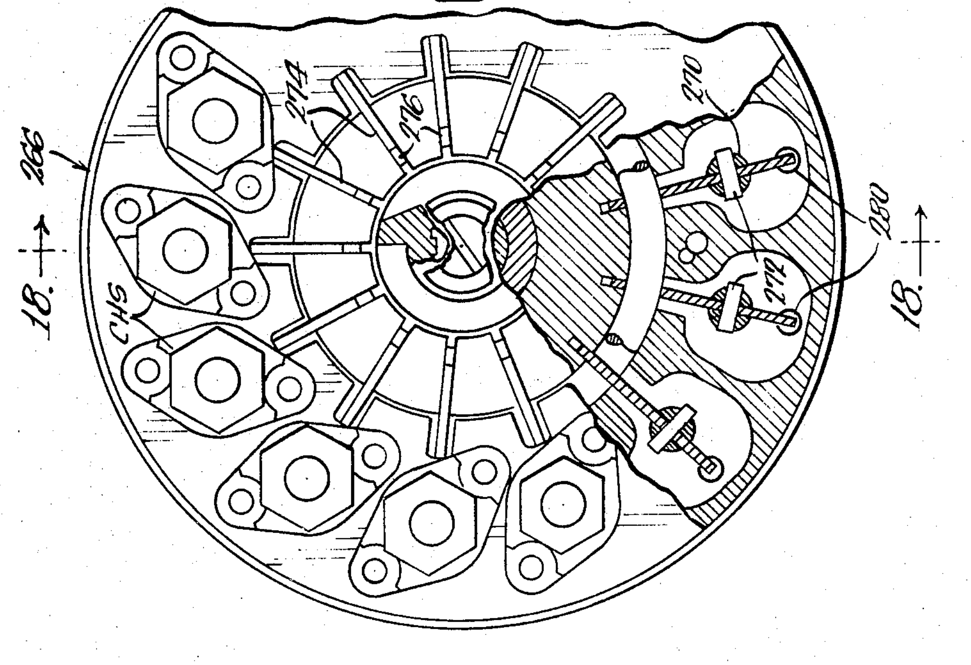
FIG. 17 is an enlarged elevational view, partly in section, of the printer wheel character selection solenoid mechanism.

A separate CHS solenoid is provided for selection of each character. The thirteen CHS solenoids are mounted on a circular housing 266 (FIGURES 17 and 18) which is secured to frame extension 268. As best seen in FIGURE 18, each CHS solenoid has a plunger 270 pinned by a pivot pin 272 to an interposed arm 274 which is pivotally mounted on a pin 276 secured to housing 266. Shaft D is freely rotatable within housing 266. A one-toothed gear 278 is mounted on shaft D to be driven by shaft D. Solenoids CHS are arranged seriatim in their circular array in the same order as their corresponding characters on wheels 250 in the direction of rotation of shaft D, such that when any selected one of the solenoids CHS is energized its interposer arm 274 is pivoted into the path of the tooth on gear 278 to stop gear 278, shaft D, gears 264, 262 and 260 and the remainder of the drive train to print wheels 220, the print wheel is in proper position for printing the character corresponding to the actuated CHS solenoid. Thus, a character is selected for printing merely by energizing the corresponding CHS solenoid, e.g. via switches CSS in FIG. 10. Springs 280 will return the interposer arm 274 after the CHS solenoid is deenergized.

Figure 19:
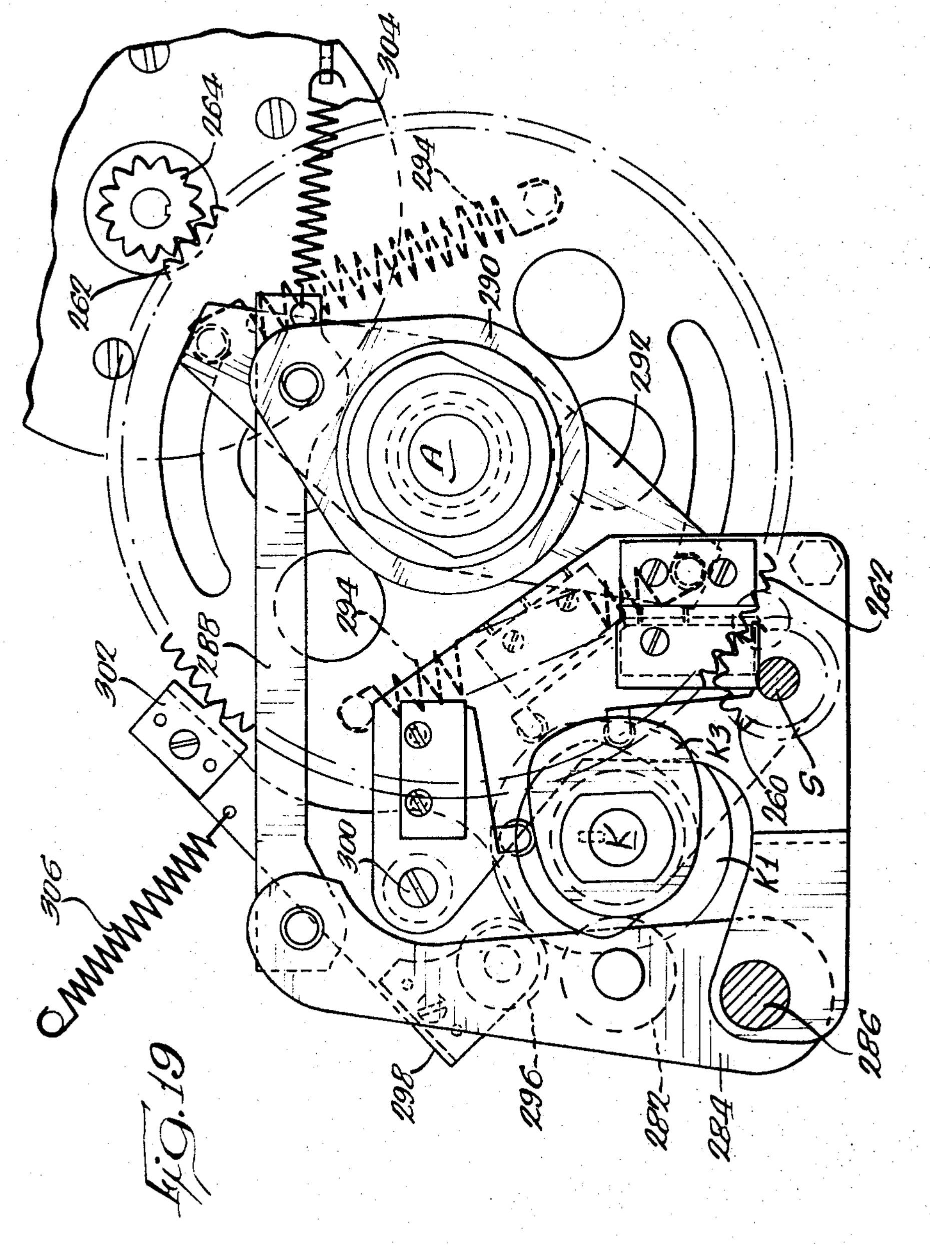
FIG. 19 is an elevational view illustrating the mechanism for indexing the printer wheels for character selection.

The drive to shaft S is a yield-type drive such that the interposers 274 can be used to stop the drive and hold the drive train to the print wheels during the printing stroke of the print arm. Referring especially to FIGURE 19, shaft K has been released for one revolution by solenoid PCS as described above. Shaft K drives counterclockwise in FIGURE 19 rotating cam K–3 which drives a follower roller 282 and arm 284 counterclockwise on pin 286 pulling link 288 and pivoting clutch assembly 290 on shaft A through a 50 degree angular counterclockwise stroke. Clutch assembly 290 is a one-way indexing clutch which engages a drive arm 292 on its counterclockwise stroke. Drive arm 292 drives gear 262 counterclockwise through tension springs 294. The full 50 degree stroke of drive arm 292 is sufficient to rotate gear 264 one full revolution in the absence of blocking by interposer arms 274. When an interposer 274 blocks rotation of gear 264, the springs 294 yield while drive arm 292 completes its full stroke counterclockwise.

At the completion of the counterclockwise drive stroke, the drive train to print wheels 220 has been driven the proper distance to set the type character of the actuated CHS solenoid for printing. Still referring to FIG. 19, near the beginning of the print cycle, cam K–1 on shaft K has presented a low to roller 296, permitting tension spring 306 to pull arm 298 counterclockwise on pivot pin 300 to disengage aligner detent 302 from gear 262 and free gear 262 during the power stroke of clutch assembly 290 and power arm 292. Clutch assembly 290 is returned by spring 304 after the low of cam K–3 is again presented to roller 282 and power arm 292 is returned as appropriate by springs 294. After printing, cam K–1 presents its high to roller 296 and returns aligner 302 clockwise into gear 262. Aligner 302 is positioned so that it engages the slope of a tooth on gear 262 and cams gear 262 backward sufficiently to take the spring load off interposer 274 to permit interposer 274 to restore. When aligner 302 is fully engaged with gear 262, it locks all gears of the drive train and the print wheels until the next print cycle. Movement of aligner 302 into gear 262 is prior to the return stroke of clutch assembly 290 so that gear 262, etc., is held during this return stroke.

*System for selecting proper frame*

As has been noted, one print wheel is provided for printing in each frame. The single print wheel prints all digits, i.e. units, tens anl hundreds, as well as foul (F), strike (X) and spare (/) indications. Provision is also made for printing a thousands digit in the total score or eleventh frame of the scoresheet. As described previously, the scoresheet accommodates three columns of printing in each of the first ten frames and four columns of printing in the eleventh or total score frame. Since each print wheel is to effect printing in each of a plurality, e.g. three or four, of printing columns, provision is made to shift each print wheel laterally within its frame for such purposes.

Figure 9:
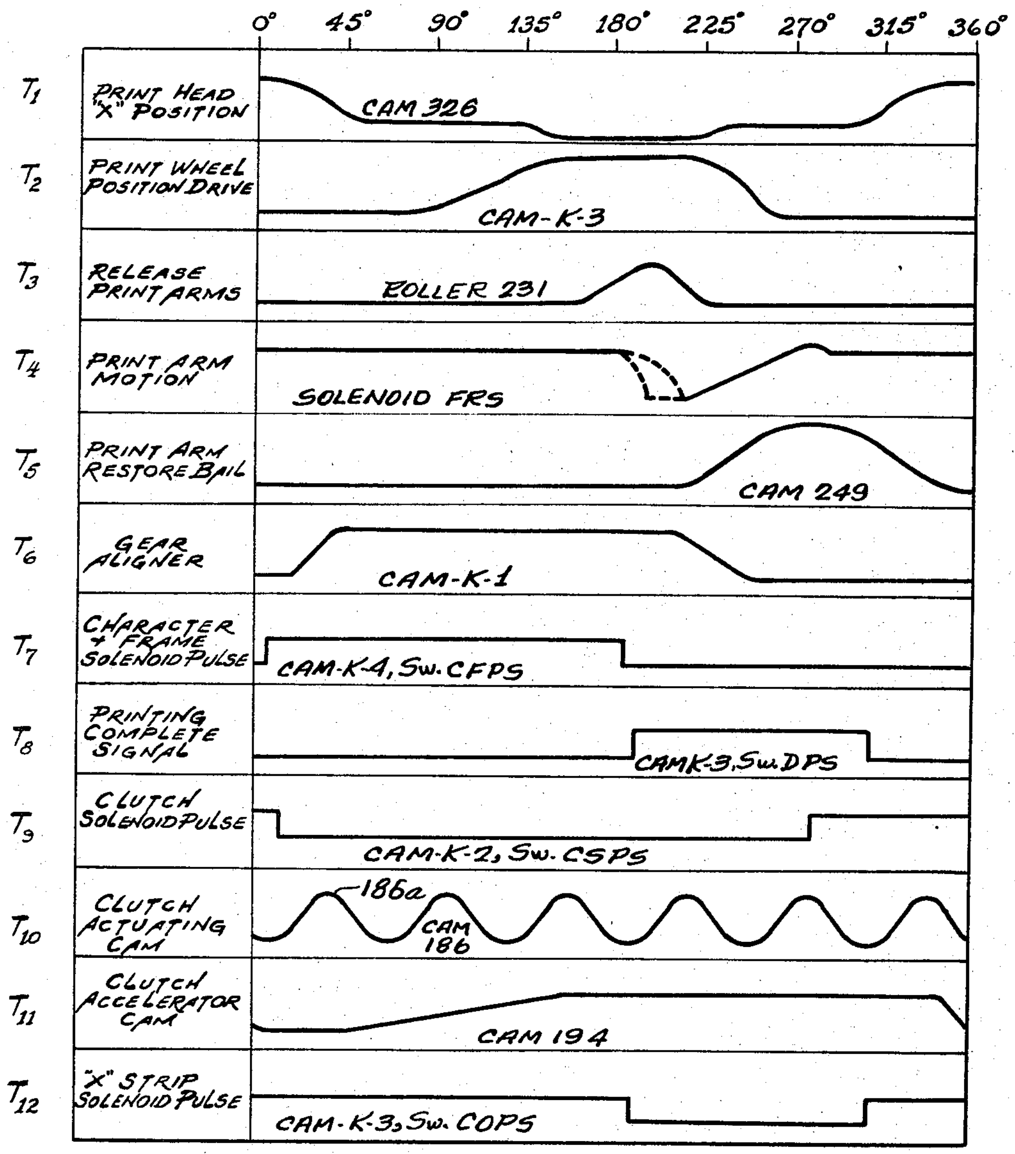
FIG. 9 is a timing chart showing timing of the operation of the print head in each printer.
Figure 11:
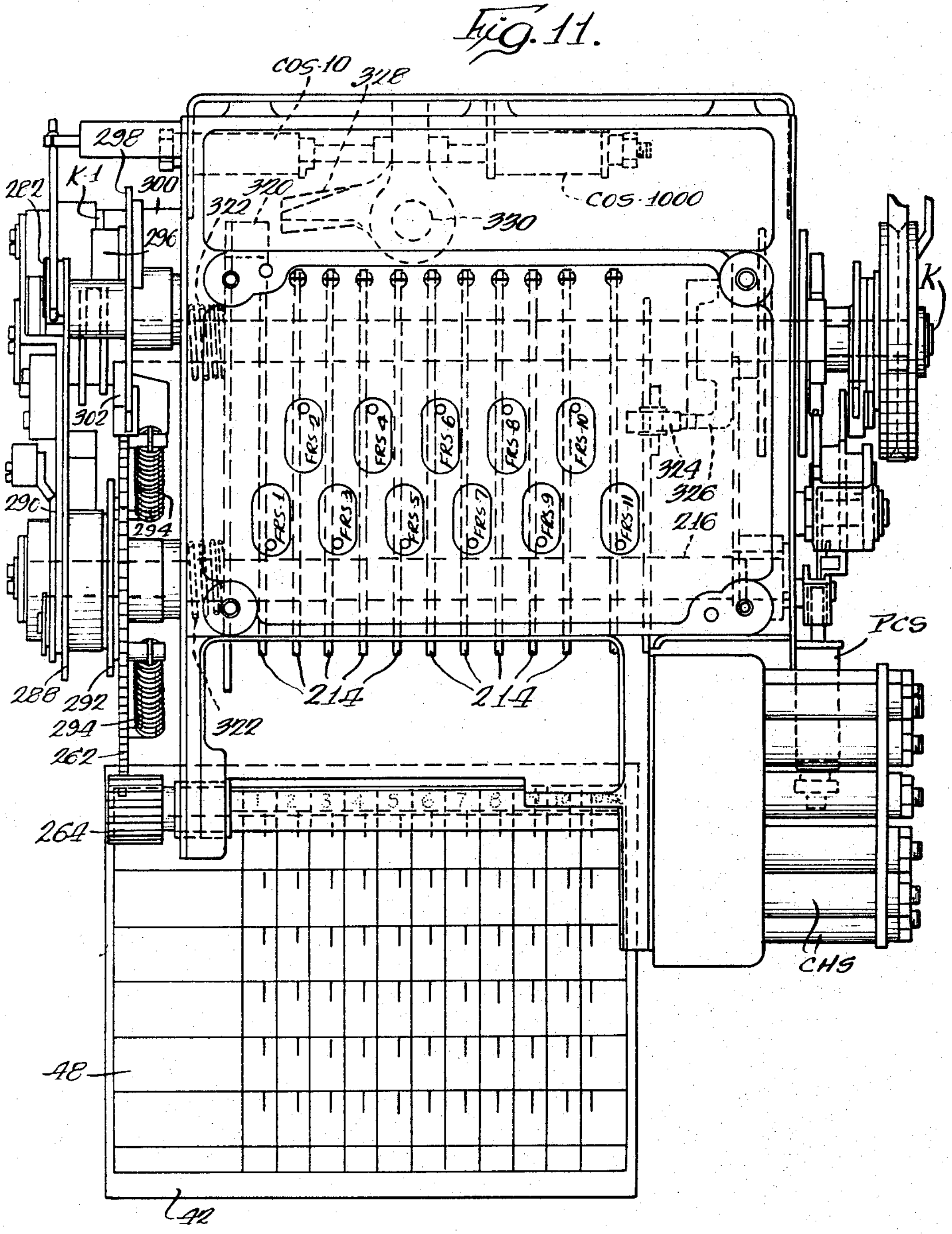
FIG. 11 is an enlarged plan view of the print head while in retracted position.
Figure 12:
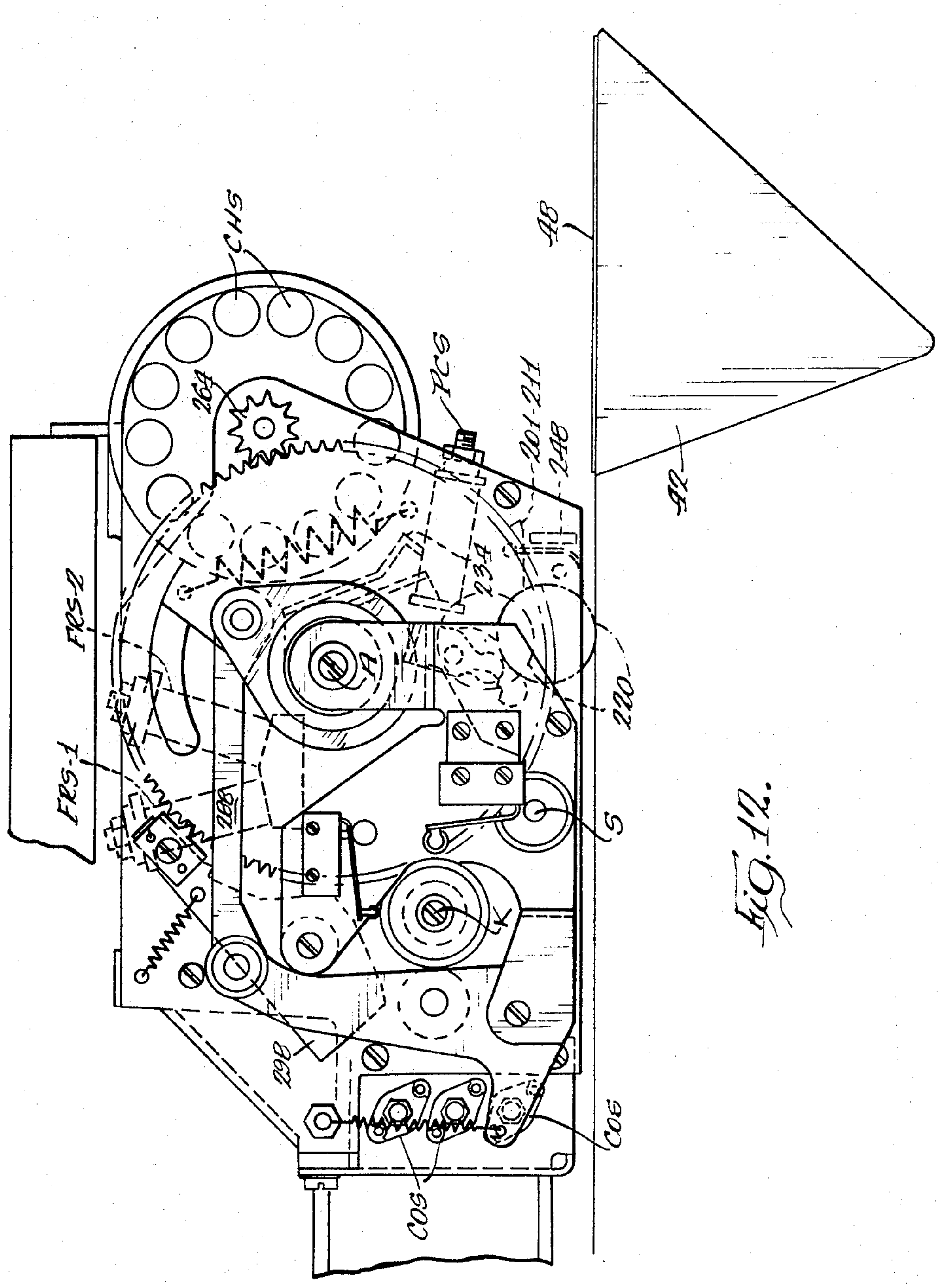
FIG. 12 is a side elevational view of the print head illustrated in FIG. 11 illustrating relative position of the platen with the print head in retracted position.
Figure 13:
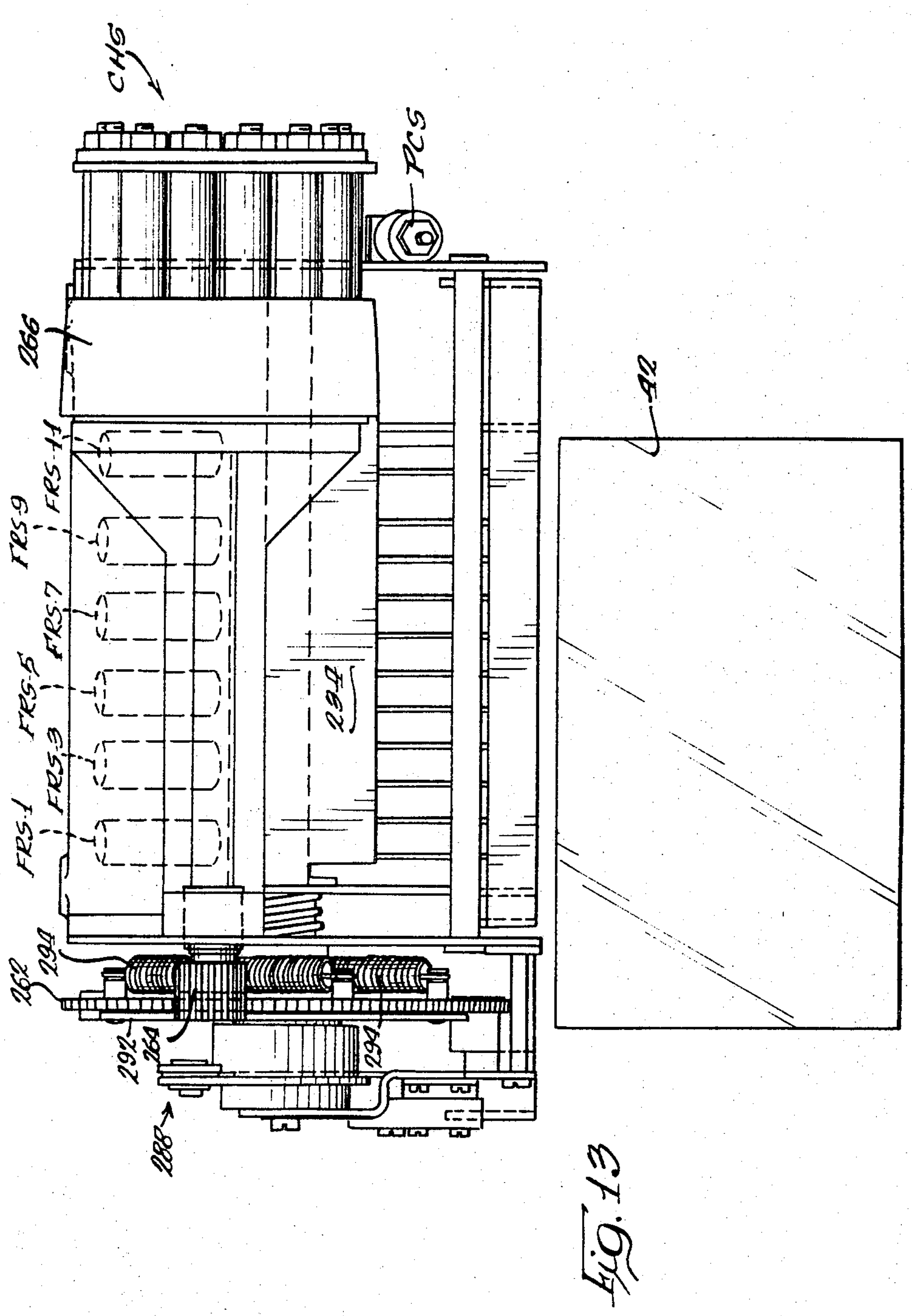
FIG. 13 is a front elevational view of the print head and platen illustrated in FIGS. 11 and 12.
Figure 14:
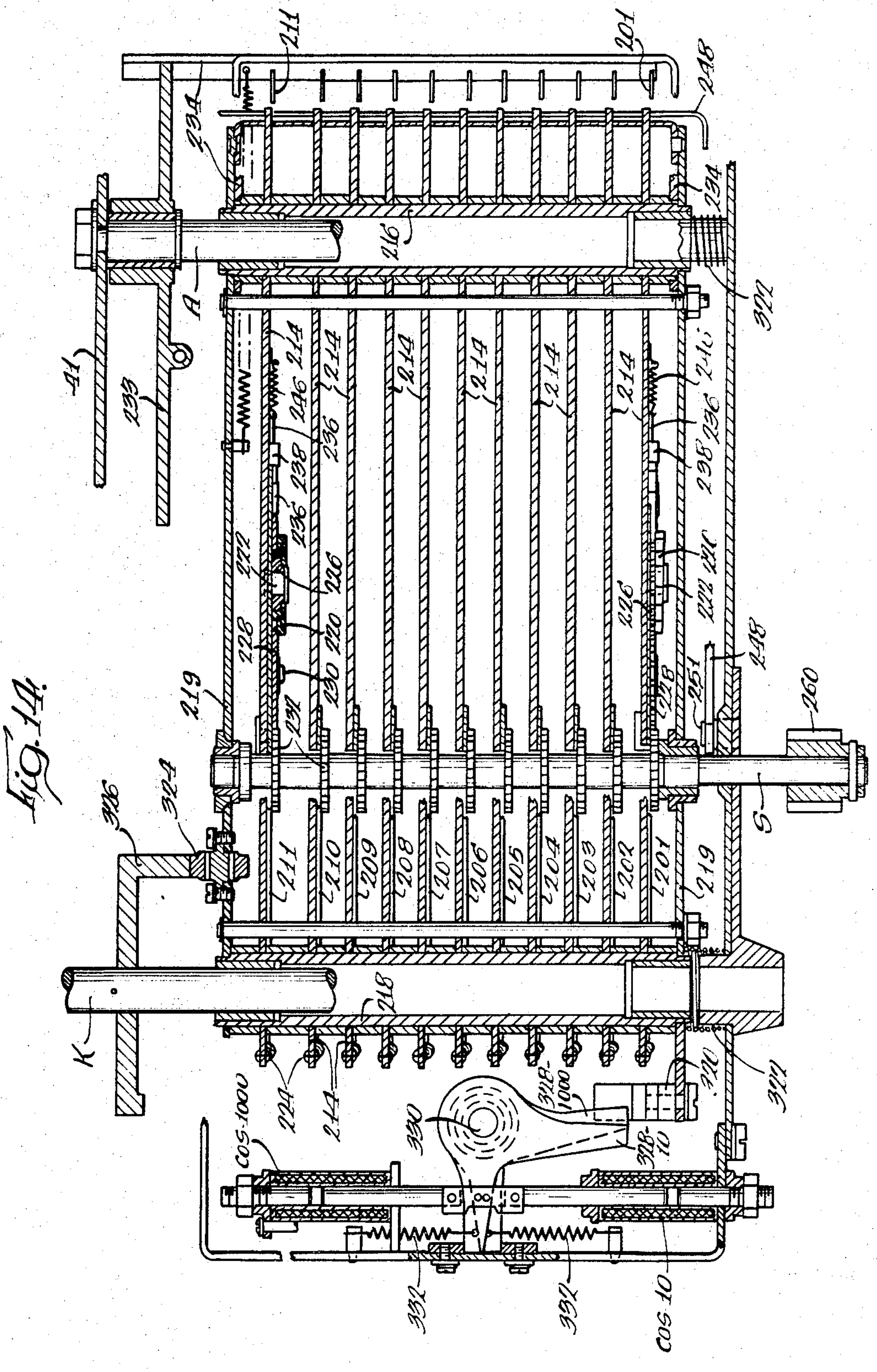
FIG. 14 is a plan section of the print head.

Referring to FIGURES 11, 14 and 16, frame 219 in the print head assembly is secured to sleeves 216 and 218 which are slideable on shafts A and K respectively. A stepped stop member 320 is also secured to sleeve 216 so that the sleeves, stop member 320, and support plates 214, which carry print arms 201 through 211, can slide as a unit relative to and on shafts A and K. As viewed in FIGURE 14, the print head unit is urged toward the top of the figure by a spring 322 so that a roller 324, mounted on frame 219, bears against a face cam 326 which is pinned to shaft K for rotation therewith. The configuration of face cam 326 is schematically shown in FIGURE 9, line $T_1$, as having a high at 0, degrees of the one revolution of shaft K. In each revolution of shaft K, cam 326 rotates to present a low to roller 324 before printing with the print wheel and then continues rotating to present its high. Thus, during each revolution of shaft K, the print head unit shifts in a direction from the bottom toward the top of FIGURE 14 under the urging of spring 322. After printing is completed, cam 326 returns the print head unit at the end of the revolution of shaft K.

The stepped stop member 320 has a series of three steps. In line with each step is a blocking latch 328, mounted for pivotal movement on a pin 330. A separate solenoid COS–10 or COS–100 is operatively connected to an arm of latches 328–10 and 328–100 to pivot the latch from an unblocking position (out of the path of stepped stop member 320) to a blocking position (in the path of stepped stop member 320) responsive to actuation of the respective COS solenoid. The third latch 328–1000 is normally in blocking position and actuation of solenoid COS–1000 pivots the latch out of blocking position. Each latch is returned by a spring 332.

The steps on stop member 320 are of proper size that when latches 328–10, 328–100 and 328–1000 are in blocking position, the print head frame 219 is blocked against further movement and is retained in proper position for printing by the type wheels 220 in the tens, hundreds, and units positions respectively, until returned by cam 326. When none of the latches is in blocking position during shifting of the print head frame 219, roller 324 will bottom out of the low of cam 326. The low of cam 326 is of proper depth and extent that when roller 324 follows this low the print wheel 220 of arm 210 travels beyond the tenth frame and into the eleventh frame the proper distance for printing the 1000's column digit in the eleventh frame and is maintained in this position until the printing operation is complete, whereupon cam 326 returns the print head frame 219. The latches for the tens and units positions are also used for stopping the print head frame 219 for printing in the first ball box and second ball box respectively on scoresheet 48.

The frame selection latch 242, which is not mounted on and does not shift with the shifting print head frame 219, is of sufficient length to remain engaged with the respective print arm 201–211 throughout the shifting between print columns. During printing, with the print wheels in proper bowler line and print column position, actuation of the proper solenoid FRS for the proper frame results in printing the correct character in the correct position on the scoresheet.

*Miscellaneous circuitry*

Referring again to FIGURE 10, it will be noted that each of the solenoids CHS can be actuated by a corresponding character selection switch CSS, each frame solenoid FRS can be actuated by a corresponding frame selection switch FSS, and each of the three column selection solenoids COS can be actuated by a corresponding column selection switch CSW. Although manual switches can be used for manual operation of the printer, the switches are shown as included in a computer circuitry and the terminals Z each indicate linkage to such computer circuitry. In a common wire to the character and frame solenoids and in a common wire to the column selection solenoids are switches CFPS and COPS, respectively. These switches are pulse switches which permit the actuation of the respective solenoids for only the proper portion of the time during the print cycle. The switches are closed by cams on the one-revolution shaft K, discussed above.

A clutch solenoid pulse switch CSPS is in series with and controls solenoids A and B to assure that the carriage frame 41 will not be moved during any print cycle until after the printing stroke of the print hammer is completed and the print arm restore bail 248 has engaged the fallen print arm for return to bail 234.

The solenoid PCS, energization of which starts the print cycle, is controlled by a switch PSW which can be closed by a computer when it is desired to effect a print operation, i.e. after the carriage 41 has come to rest. A done-printing or PRINT COMPLETE signal is given by the printer by closing switch DPS via cam K–3 before the printing operation is complete, but the computer cannot assimilate the done-printing signal and give another signal effective to start the movement of carriage 41 until switch CSPS has reclosed later in the print cycle.

Also shown diagrammatically in FIGURE 10 are a series of normally closed switches for deenergizing each of the printer circuit commutator segments on the outer ring on commutator 90. The starting segment ST is energized, e.g. by the computer, and the moving contact 92 moves from its home position on ST and sweeps the circuit board. Switches ID–1*b*, 2*b*, etc., are selectively opened by the bowler to identify the bowler in whose line the printing operation is to be carried out. Usually one of these ID switches is opened manually by a bowler at a bowler identification panel just prior to bowling. The remaining ID switches, ID–1*f* through ID–6*f*, are closed by the computer to indicate that printing is to be effected in the frame space rather than the ball score spaces. These six switches, ID–1*f* through ID–6*f*, can be combined as a single switch which is closed by the computer only after the printer has traveled to the appropriate bowler line. In opening the ID–1*f* through ID–6*f* switches, the computer will also close the corresponding switch ID–1*b* through ID–6*b* so that the printer can proceed to the next position for printing the frame score. Alternatively, other arrangements can be made for the computer to energize the ID– *b* contact which has stopped the printer while deenergizing the corresponding ID– *f* contact or all of the ID– *f* contacts. The energization of the ID– *b* contact and deenergization of the ID– *f* contact in effect gives the printer a "go" signal to proceed from the box score printing position of a given bowler to the frame score printing position for the same bowler.

*Exemplary timed operation*

As a more particular example of the operation of the illustrated printer system, all elements in the print head are in home position when the print head on carriage 41 comes to rest in the proper bowler's line. This movement of the carriage is controlled through the commutator 90 by the computer which feeds information into the contacts of commutator 90 described hereinabove.

Also prior to cycling the print head, one of the thirteen character selection switches CSS has been closed, one of the eleven frame selection switches FSS has been closed, and one or none of the three column selection switches CSW has been closed, e.g. by the computer. Assuming that a print cycle is required to print the character 5 in the 10's column of frame No. 4, as part of the Bowler No. 2's cumulative frame score, the ID switch has deenergized contact ID–2*b* and the computer then reverses contacts ID–2*b* and ID–2*f* to cause the print head carriage 41 to move to the proper position for printing frame score in the second bowler's line. The character selection switch CSS–5 has been closed and the frame selection switch FSS–4 has been closed. Column selection switch CSW–10 has also been closed to immediately pull in solenoid COS–10 and latch 328–10. The computer then closes switch PSW to energize the solenoid PCS and start the one revolution of shaft K which times and controls the print operation. The sequence of operation is given hereinafter, listing first the number of degrees of the 360 degree cycle of shaft K. In the listing, and indication of the timing chart line in FIGURE 9 which is applicable to the operation is indicated in parenthesis. A summary of the function performed is also given:

| Portion of cycle in degrees of rotation of shaft K (chart line) | Function performed |
|---|---|
| 0 degrees to 36 degrees (T–1). | Cam 326 moves the print head frame 219 relative to the remainder of carriage 41 until it is stopped by latch 328–10 in proper position for printing in the 10's column. |
| 5 degrees to 185 degrees (T–7). | Cam K–4 closes witch CFPS to permit energization of solenoids CHS–5 and FRS–5 by switches CSS–5 and FSS–5, resulting in pulling the corresponding interposer 274 and latch 242, resulting in setting the character 5 for printing by all of the print arms and resulting in readying the print arm in frame No. 4 for printing. |
| 15 degrees to 45 degrees (T–6). | Cam K–1 disengages gear aligner 302 from gear 262 so that gear 262 can be moved during the typesetting operation. |
| 60 degrees to 180 degrees (T–2). | Cam K–3 drives the print wheels and related gearing for the typesetting operation until the single-toothed gear 278 stops on the interposer 274 operated by solenoid CHS–5. |

| Portion of cycle in degrees of rotation of shaft K (chart line) | Function performed |
|---|---|
| 148 degrees to 198.5 degrees (T-3 and T-4). | Bail 234 is moved by roller 231 and all print arms 201-211 are released at about 180 degrees; however, since all of arms 201-203 and 205-211 are still held by their corresponding latches 242, only arm 204 is driven through the print stroke to print the character 5 in the 10's column of frame No. 4; the print arm 204 strikes and prints on the scoresheet by approximately 200 degrees of the cylce. |
| 200 degrees to 360 degrees (T-5). | Cam 249 moves print arm restore bail 248 upward and bail 248 contacts print arm 204 by about 215 degrees; bail 248 lifts print arm 204 until about 271 degrees when it engages and lifts the remaining print arms 201-203 and 205-211 from their individual frame selection latches 242; from 271 degrees to 280 degrees there is a latch clearance so that bail 234 can engage all eleven print arms. |
| | Cam 249 returns bail 248 downward from 280 degrees to 360 degrees, and at 289 degrees all print arms are left resting on bail 234. |
| 200 degrees to 360 degrees (T-6). | Cam K-1, presenting its low, causes gear alinger 302 to reengage gear 262 such that from about 227-260 degrees the alinger is engaged with the gear 262 and moves the gear 262 a sufficient amount clockwise as viewed in Figure 19 to provide clearance between the tooth of gear 278 and the actuated interposer 274 to permit withdrawal of interposer 274. |
| 215 degrees to 275 degrees (T-2). | Cam K-3 restores the print wheel drive mechanism by returning link 288 and clutch assembly 290. |
| 285 degrees (T-9) | Cam K-2 closes switch CPS to enable operation of solenoids A and B for reorienting carriage frame 41 for the next print operation. |
| 290 degrees to 350 degrees (T-1). | Cam 326 returns print head frame 219 from the 10's column to its home position; the print head frame 219 begins to move toward home position about 314 degrees and is fully restored in home position by 350 degrees. |
| 360 degrees | The cycle is completed, all solenoids have been deenergized and clutch latch 180 has been reengaged with pawl 190, stopping shaft K at the end of its revolution. |

While the invention has been described in connection with printing of score information on bowling score sheets, it should be understood that it may be used in printing other information.

I claim:

1. A device for printing score information on a scoresheet, which device comprises a printer having a printhead, a plurality of print members mounted in said printhead in an array across the printhead including one print member for each of a plurality of separate areas on the sheet, means mounting said printhead for lateral movement a limited distance for permitting each of the print members to print in each of a plurality of columns in its respective area, means blocking lateral movement of the printhead to retain each print member within its separate area, selectively operable means for positioning the printhead with each print member disposed in a preselected one of said columns of its area and means for separately operating the print members for printing by a selected one of the print members.

2. The device of claim 1 wherein each of the printing members comprises an indexable element carrying a plurality of type characters each adapted to be indexed to a position for printing, and including a plurality of pivotally mounted arms on the printhead each carrying one of the indexable printing elements and mounted for movement through the printing stroke.

3. The device of claim 2 wherein the indexable printing elements comprise rotary wheels respectively, and including character selection means for simultaneously indexing all of the printing wheels.

4. The device of claim 3 including an aligning and locking means for holding each printer wheel in properly indexed position during printing.

5. A device for printing information on a sheet which comprises a plurality of print arms, one for each of a plurality of laterally spaced areas to be printed on the sheet, means defining a print station adjacent the surface of the sheet, means for driving each of the print arms to said station for printing on the sheet, separate latch means for each of said print arms, means for selectively releasing each of said latch means, a latching bail for holding all of said print arms away from said station with any of said latches released, means for releasing said latching bail thereby permitting each print arm released by said latches to drive to said station, and return bail means for returning a print arm from said station back to said release bail means.

6. The device of claim 5 including control means comprising a one-revolution clutch, a shaft driven by said clutch through one revolution for each print cycle, means on said shaft timing the print operation and including means for releasing said release bail and means for thereafter actuating said return bail to return the released print arm to said release bail.

7. The device of claim 5 wherein said means for selectively releasing the latches include means for selecting a frame in which to print.

8. The device of claim 5 including guide means for guiding each of said print arms from said release bail to said print station during each printing stroke.

9. The device of claim 5 wherein said print arm comprises an arm with a wheel mounted for rotation thereon, said wheel being indexable about its axis for presenting a selected one of a plurality of type characters in position for printing at said print station when the arm is released.

10. The device of claim 9 including separate detent means for detenting each print wheel during its printing stroke.

11. The device of claim 9 including separate drive train means for indexing each print wheel.

12. The device of claim 11 including common one-direction drive means for driving all of the drive train means.

13. A device for printing score information on a scoresheet from which the information is to be projected by a projection system, said projection system including an internally reflecting platen surface of a prism for supporting the scoresheet during printing and during projecting, which device comprises frame means, a carriage mounted on said frame for movement between a retracted position and a projected position overlying said platen surface, means for driving said carriage on said frame, a printhead mounted on said carriage for movement away from a home position in a direction transverse to the direction of movement of said carriage, a plurality of print members each having an indexable print wheel mounted in said printed head for movement between an idle position and a print station for printing on a scoresheet or the platen surface, common drive means for indexing each of said print wheels to dispose the same type character for printing at the print station, separate latch means for each of said print members for holding the print members away from said print station, means for driving each print member toward said station upon release, bail means holding all of said print members away from said station, selectively operable means for selecting a frame in which to print on said scoresheet for releasing the latch means corresponding to the print means for said frame, selectively operable means for selecting the print column in the frame in which it is desired to print, means responsive to said selectively operable print column selection means for stopping movement of said printhead on said carriage with the type disposed for printing in a selected column, means for moving a released print arm from said station to said release bail, a one-revolution clutch and a shaft driven thereby, means for actuating said one-revolution clutch responsive to a print signal, and means responsive to rotation of said shaft operable seriatim as follows: means at the beginning of each cycle of said shaft for actuating said character and frame selection means, means blocking activation of said carriage driving means, means actuating said printhead moving means, means for driving said common drive to dispose each of said print wheels with the selected character type in position for printing, means for actuating said means for releasing the latch means corresponding to the frame in which printing is desired, means for releasing said release bail, means providing a signal that printing is complete, means for actuating said return bail to return the released print arm to said release bail for engagement by said release bail and said latch means, means returning said restoring bail to adjacent the print station, means unblocking activation of said carriage driving means, and means returning said printhead to home position.

14. A device for printing information on a sheet including a surface for supporting the sheet during printing, which device comprises frame means, a carriage mounted on said frame for movement between a retracted position and a projected position overlying said surface, means for driving the carriage between said positions, a printhead mounted on said carriage, printing means having type for a plurality of different characters in said printhead for printing on the sheet on said surface at a print station adjacent the platen surface, means for selecting a character to be printed, means for setting type in said printing means corresponding to the selected character, printing drive means for driving the printing means with the set type toward said station for printing, selectively operable means for selecting a frame in which to print on said scoresheet, means for actuating said driving means to print in the selected frame, means for returning said printing means away from said station after each print stroke, a one-revolution clutch and a shaft driven thereby, means for actuating said one-revolution clutch responsive to a print signal, and means responsive to rotation of said shaft operable seriatim as follows: means at the beginning of each cycle of said shaft for activating said character and frame selecting means, means blocking activation of said carriage driving means, means for driving said type setting means to set the type for the selected character in position for printing, means for actuating said printing drive means for driving the printing means to the print station, means providing a signal that printing is complete, means for actuating said returning means to return the printing means away from said station, and means unblocking activation of said carriage driving means.

15. A device for printing information on a sheet, which device comprises a printer having a printhead, a plurality of print members mounted in said printhead against movement toward and away from each other in an array across the printhead, said array including only one print member for printing in each of a plurality of separate laterally spaced areas on the sheet, means mounting said printhead for lateral movement a limited distance for permitting each of the print members to print in each of a plurality of columns within its respective area along, selectively operable means for positioning the printhead with each print member disposed within its area in a preselected one of said columns and selectively operable means for separately actuating each of said print members to print in its respective area.

16. A device for printing information on a sheet, said device comprising frame means defining print station adjacent the sheet surface, a plurality of print members mounted for movement toward and away from said print station, separate releasable means for retaining each of said print members in a non-print position away from said station, selectively operable means for separately releasing each of said retaining means, a common retaining means for holding all of said print members away from said print station upon release of any of said separate retaining means, means for driving said print members to said station for printing, means for releasing said common retaining means for permitting said drive means to drive to said station one of said print members having its separate retaining means released, and means for returning the released print arm from said station to re-engage its separate retaining means.

17. A device for printing information on a sheet, which device comprises a printer having a print head, a plurality of print members each having an indexable element carrying a plurality of type characters to be selectively indexed to a printing position for printing and each including an arm carrying the indexable printing element, means pivotally mounting said arms in the printhead with said indexable elements in an array across the printhead for movement through a printing stroke, said print members including one print member for each of a plurality of areas on the sheet, means mounting said printhead for lateral movement a limited distance for permitting each of the print members to print in each of a plurality of columns within its respective printing area, selectively operable means for positioning the printhead with the print members disposed in a preselected one of said columns, and a plurality of release means mounted on the printhead and respectively associated with the pivotally mounted arms and selectively operable for releasing a selected arm for printing in a selected printing area.

18. The device of claim 17 including a restoring bail mounted on said printhead common to all of the pivotally mounted arms and adapted to rest any of the latter after a printing operation.

19. A device for printing information on a sheet which comprises a printhead including movably mounted print members having a plurality of different elements indexable to a print position for printing characters on the sheet, means in the printhead mounting the print members for movement from a position overlying the sheet to a printing position with the print member striking the sheet, motor means moving through a reciprocal cycle, means for indexing said type elements in one direction to dispose a selected type element in correct position for striking the sheet on movement of said print members to said printing station, and clutch means between said motor means and said drive means for driving said drive means in only one direction, said clutch means including resilient lost motion means for return of said motor means in the other direction of its reciprocation.

20. The device of claim 19 including means for individually selecting each of the plurality of different characters of said type members, blocking means for stopping said drive means in position with the type member on said print wheel in correct position for printing the selected character by movement of said print arm and wheel to said printing station, said blocking means holding said drive means to hold said print wheel during movement of the print arm and wheel to the printing station, and yield drive means for completing the remainder of the stroke of said motor means with said drive means blocked.

21. The device of claim 20 including means for releasing said blocking means after movement of said print arm to said printing station.

22. The device of claim 21 including means defining a print cycle comprising a one-revolution clutch and cam means driven by said clutch for actuating said motor means to set the type of the print wheel, thereafter driving said print arm to the printing station and returning said print arm to retracted position, and for controlling said releasing means to permit said blocking means to hold through the end of the cycle, and means for actuating said releasing means at the beginning of each cycle.

23. A device for printing bowling score information on a score sheet from a source of bowler identification information, a source of score valves and a source of frame information, comprising a support surface for supporting the score sheet with bowler lines extending in an X direction and frame columns extending in a Y direction, a printer carriage, means mounting said carriage for movement relative to the score sheet in the Y direction, means for moving said carriage in the Y direction responsive to bowler identification to a preselected bowler line, printing means of small total mass compared with the carriage and comprising a plurality of print members each having a plurality of different type character elements mounted for indexing a selected type character element to a print position, means mounting said printing means on said carriage for movement in the X direction of all print members between columns each in a limited area, means responsive to score information for moving said printing means in an X direction to dispose the proper print member in the proper column after movement in the Y direction to the proper bowler's line to position the proper printing element at the print position in the proper column including means for selecting the desired column for printing and means blocking movement of the print member beyond the selected column and means for actuating said print means to print the selected character in the proper column.

24. A device for printing score information on a scoresheet, which device comprises a printer having a printhead, a plurality of print members mounted in said printhead in an array across the printhead including one print member for each of a plurality of areas on the sheet, means mounting said printhead for lateral movement a limited distance for permitting each of the print members to print in each of a plurality of columns in its respective area, selectively operable means for positioning the printhead with the print members disposed in a preselected one of said columns including means for selecting the desired column for printing and means blocking movement of the print means beyond the selected column, and means for separately operating the print members for printing by a selected one of the print members.

25. A device for printing score information on a scoresheet, which device comprises a printer having a printhead, a plurality of print members mounted in said printhead in an array across the printhead including one print member for each of a plurality of areas on the sheet, each print member comprising an indexable element carrying a plurality of type characters adapted to be indexed to a position for printing, character selection means for simultaneously indexing all of said indexable elements comprising a yieldable indexing drive and selectively operable stop means corresponding respectively with the characters on the print elements and positionable for controlling character position, means mounting said printhead for lateral movement a limited distance for permitting each of the print members to print in each of a plurality of columns in its respective area, selectively operable means for positioning the printhead with the print members disposed in a preselected one of said columns and means for separately operating the print members for printing by a selected one of the print members.

26. A device for printing bowling score information on a score sheet from a source of bowler identification information, a source of score values and a source of frame information, comprising a support surface for supporting the score sheet with bowler lines extending in an X direction and frame columns extending in a Y direction, a printer carriage, means mounting said carriage for movement relative to the score sheet in the Y direction, means for moving said carriage in the Y direction responsive to bowler identification to a preselected bowler line, printing means of small total mass compared with the carriage and comprising a plurality of print members spaced along said X axis each having a plurality of different type character elements mounted for indexing a selected type character element to a print position, common means for indexing all of said printing members to provide the same type character at each printing member printing position, means mounting said printing means on said carriage for movement in the X direction, means responsive to score information for moving said printing means in an X direction after movement in the Y direction to the proper bowler's line to position the proper printing element at the print position in the proper column of the score sheet, and means for separately actuating each print member to print the selected character in the proper column and blocking actuation of non-selected print members.

27. A device for printing bowling score information on a score sheet from a source of bowler identification information, a source of score values and a source of frame information, comprising a support surface for supporting the score sheet with bowler lines extending in an X direction and frame columns extending in a Y direction, printing means having a plurality of print members spaced along the X axis each with a plurality of type character elements mounted for indexing a selected type character element to a print position, common means for indexing all of said printing members to provide the same type character at each printing member printing position, means mounting said printing means for movement in both X and Y directions relative to the score sheet, means responsive to score information and bowler identification respectively for moving said printing means in X and Y directions respectively to position the proper print member in the proper column of the score sheet and means for actuating said print means to print the selected character in the proper column and blocking actuating of non-selected printing members.

28. A device for printing information on a sheet, which device comprises a platen surface for receiving and supporting the sheet, printing means having a plurality of print members including a separate one for each of a plurality of laterally spaced areas to be printed on said sheet, first means mounting said printing means for forward and rearward reciprocal movement between a retracted station removed rearwardly from said platen surface beyond the edge thereof through a plurality of print stations overlying said platen surface and return to said retracted station, second means mounting all of said printing members for concurrent lateral shifting movement between closely adjacent columns and means for individually actuating each one of said print members for printing individually on said sheet.

29. The device of claim 28 wherein said actuating means comprises means for releasing only one of said print members for printing on said sheet while holding the remaining print members against release.

30. The device of claim 28 wherein said platen surface is the internally reflective surface of a light-transmitting platen.

31. The device of claim 28 including means controlling said printing means through cyclic operation for printing once each cycle, and means blocking movement of said printing means between print stations during each print cycle.

References Cited

UNITED STATES PATENTS

| | | | |
|---|---|---|---|
| 3,247,789 | 4/1966 | Webb et al. | |
| 3,289,574 | 12/1966 | Webb. | |
| 3,295,438 | 1/1957 | Webb et al. | |
| 3,295,439 | 1/1957 | Miller et al. | |
| 1,494,184 | 5/1924 | Pannier | 101—316 |
| 1,608,145 | 11/1926 | Tingley | 235—60 |
| 1,881,578 | 10/1932 | Hinds | 101—316 |
| 2,195,844 | 4/1940 | Von Pein | 101—19 |
| 2,963,963 | 12/1960 | Grasso | 101—88 |
| 3,124,355 | 3/1964 | Mentzer et al. | 273—54 |

WILLIAM B. PENN, *Primary Examiner.*

U.S. Cl. X.R.

101—316, 322, 90